(12) United States Patent
Aoki et al.

(10) Patent No.: US 11,368,834 B2
(45) Date of Patent: Jun. 21, 2022

(54) INFORMATION-PROCESSING DEVICE AND COMMUNICATION SYSTEM

(71) Applicant: NTT DOCOMO, INC., Tokyo (JP)

(72) Inventors: Takahiro Aoki, Tokyo (JP); Toshio Kaneda, Tokyo (JP); Yuji Tamai, Tokyo (JP); Naoya Noguchi, Tokyo (JP); Ayumi Yamashita, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/276,562

(22) PCT Filed: May 21, 2020

(86) PCT No.: PCT/JP2020/020091
§ 371 (c)(1),
(2) Date: Mar. 16, 2021

(87) PCT Pub. No.: WO2020/235626
PCT Pub. Date: Nov. 26, 2020

(65) Prior Publication Data
US 2022/0070657 A1 Mar. 3, 2022

(30) Foreign Application Priority Data
May 23, 2019 (JP) .............................. JP2019-096822

(51) Int. Cl.
*H04W 8/18* (2009.01)
*H04W 8/20* (2009.01)
*H04W 12/30* (2021.01)
*H04W 12/06* (2021.01)

(52) U.S. Cl.
CPC ........... *H04W 8/205* (2013.01); *H04W 8/183* (2013.01); *H04W 12/06* (2013.01); *H04W 12/35* (2021.01)

(58) Field of Classification Search
None
See application file for complete search history.

(56) References Cited

U.S. PATENT DOCUMENTS

| 2016/0006728 A1 | 1/2016 | Park et al. |
| 2020/0287896 A1 | 9/2020 | Park et al. |

FOREIGN PATENT DOCUMENTS

| EP | 2963955 A1 | 1/2016 |
| JP | 2017195455 A | 10/2017 |

OTHER PUBLICATIONS

Extended European Search Report issued in corresponding European Patent Application No. 20809458.1, dated Jul. 8, 2021.
International Search Report issued in corresponding PCT Application No. PCT/JP2020/020091 dated Jun. 30, 2020.

*Primary Examiner* — Gary Lafontant
(74) *Attorney, Agent, or Firm* — MKG, LLC

(57) ABSTRACT

An in-vehicle mobile station is presented. When a user purchases vehicle including in-vehicle mobile station, s/he operates his/her communication device and in-vehicle mobile station to write a profile in a SIM of in-vehicle mobile station and to activate the SIM. Specifically, the user initially operates communication device to register a profile to be written in the SIM of in-vehicle mobile station, in contract information management device. Subsequently, the user operates in-vehicle mobile station to write the profile registered in contract information management device, in in-vehicle mobile station, and to activate the mobile station.

12 Claims, 14 Drawing Sheets

| USER ID | VEHICLE IDENTIFICATION INFORMATION | SIM IDENTIFICATION INFORMATION |
|---|---|---|
| U001 | C001 | eID001 |
| U002 | C002 | eID002 |
| U003 | C003 | eID003 |
| ... | ... | ... |

FIG. 6

| SIM IDENTIFICATION INFORMATION | TELECOMMUNICA-TIONS CARRIER IDENTIFICATION INFORMATION | CONTRACT EXISTANCE | AUTHENTICA-TION INFORMATION |
|---|---|---|---|
| eID001 | ICCID001 | NO | — |
| eID002 | ICCID013 | NO | — |
| eID003 | ICCID025 | NO | — |
| ... | ... | ... | ... |

FIG. 7

| SIM IDENTIFICATION INFORMATION | TELECOMMUNICA-TIONS CARRIER IDENTIFICATION INFORMATION | CONTRACT EXISTANCE | AUTHENTICA-TION INFORMATION |
|---|---|---|---|
| eID001 | ICCID001 | YES | PASS001 |
| eID002 | ICCID013 | NO | — |
| eID003 | ICCID025 | NO | — |
| ... | ... | ... | ... |

FIG. 8

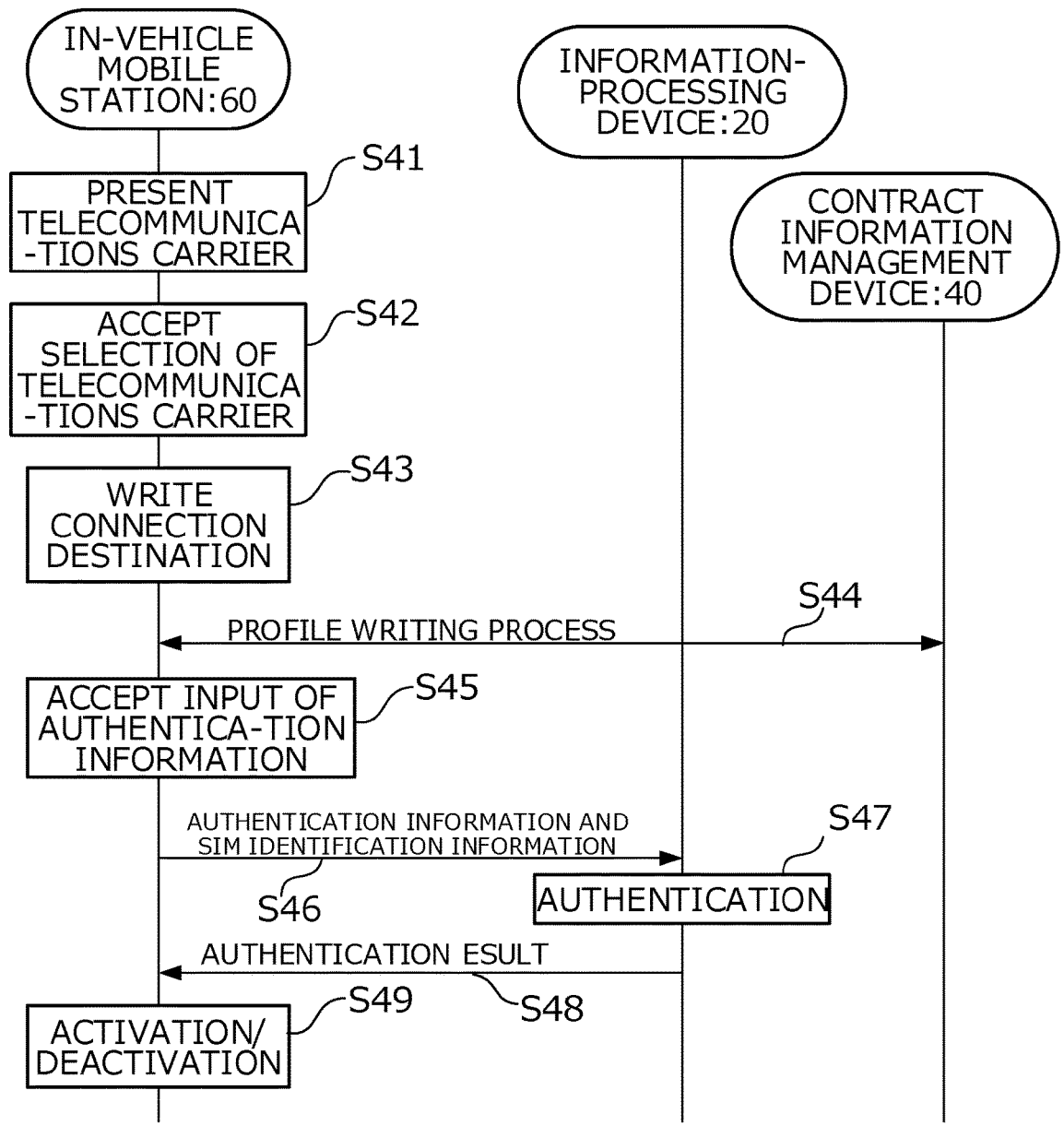

| SIM IDENTIFICATION INFORMATION | TELECOMMUNICATIONS CARRIER IDENTIFICATION INFORMATION | CONTRACT EXISTANCE |
|---|---|---|
| eID001 | ICCID001 | YES |
| eID002 | – | NO |
| eID003 | – | NO |
| ... | ... | ... |

FIG. 18

| USER ID | VEHICLE IDENTIFICATION INFORMATION | SIM IDENTIFICATION INFORMATION | CONTRACT EXISTANCE |
|---|---|---|---|
| U001 | C001 | eID001 | YES |
| U002 | C002 | eID002 | NO |
| U003 | C003 | eID003 | NO |
| ... | ... | ... | ... |

FIG. 19

INFORMATION-PROCESSING DEVICE AND COMMUNICATION SYSTEM

TECHNICAL FIELD

The present invention relates to a technique for enabling an in-vehicle mobile station to use a communication service.

BACKGROUND

To enable a mobile station to use a communication service, it is necessary to write information, referred to as a profile, in an integrated circuit (IC) card, referred to as subscriber identify module card (SIM), and to activate the profile. In recent years, an embedded SIM (eSIM) in which a profile can be written via a communication network has been developed (for example, refer to JP 2017-195455 A1). For use of eSIMs, manufacturers of in-vehicle communication devices need not write a profile in advance depending on an export destination. Rather, manufacturers simply provide in-vehicle communication devices with an eSIM in which no profile has been written. A user of the thus manufactured in-vehicle communication device then writes a profile in an eSIM at an export destination to enable use of the device with a communication service.

It is preferable for a user of an in-vehicle mobile station to be able to write with ease a profile in an eSIM and to activate the eSIM. An object of the present invention is to make an in-vehicle mobile station usable in an easy method.

SUMMARY OF THE INVENTION

The present invention provides an information-processing device comprising: a first acquisition unit configured to acquire subscriber identify module card (SIM) identification information of a SIM of an in-vehicle mobile station, and telecommunications carrier identification information for identifying a telecommunications carrier that provides a communication service to the in-vehicle mobile station; a storage unit configured to store the SIM identification information and the telecommunications carrier identification information that are acquired by the first acquisition unit, in association with authentication information for authenticating a user of the in-vehicle mobile station; a notification unit configured, upon detecting that a communication service contract is signed between the user and a telecommunications carrier identified by the telecommunications carrier identification information acquired by the first acquisition unit, to notify a communication device of the user of the authentication information; a second acquisition unit configured to acquire, from the in-vehicle mobile station, authentication information input in the in-vehicle mobile station and the SIM identification information of the in-vehicle mobile station; an authentication unit configured to perform user authentication by checking the authentication information and the SIM identification information of the in-vehicle mobile station that are acquired by the second acquisition unit, against the authentication information and the SIM identification information of the in-vehicle mobile station that are stored in the storage unit; and an activation unit configured, upon detecting that the user authentication succeeds, to activate the SIM of the in-vehicle mobile station, in which a profile is written.

The present invention also provides an information-processing device comprising: a first acquisition unit configured to acquire SIM identification information of a SIM of an in-vehicle mobile station, and telecommunications carrier identification information for identifying a telecommunications carrier that provides a communication service to the in-vehicle mobile station; a storage unit configured to store the SIM identification information and the telecommunications carrier identification information that are acquired by the first acquisition unit, in association with authentication information for authenticating a user of the in-vehicle mobile station; a first notification unit configured, upon detecting that a communication service contract is signed between the user and a telecommunications carrier identified by the telecommunications carrier identification information acquired by the first acquisition unit, to notify a communication device of the user of the authentication information; a second acquisition unit configured to acquire, from the in-vehicle mobile station, the SIM identification information of the in-vehicle mobile station; a second notification unit configured to notify the in-vehicle mobile station of the telecommunications carrier identification information which is stored in the storage unit in association with the SIM identification information acquired by the second acquisition unit; a third acquisition unit configured to acquire, from the in-vehicle mobile station, authentication information input in the in-vehicle mobile station, and the SIM identification information of the in-vehicle mobile station; an authentication unit configured to perform user authentication by checking the authentication information and the SIM identification information of the in-vehicle mobile station that are acquired by the third acquisition unit, against the authentication information and the SIM identification information of the in-vehicle mobile station that are stored in the storage unit; and an activation unit configured, upon detecting that the user authentication succeeds, to activate the SIM of the in-vehicle mobile station, in which a profile is written.

The present invention also provides an information-processing device comprising: a first acquisition unit configured to acquire SIM identification information of a SIM of an in-vehicle mobile station, and telecommunications carrier identification information for identifying a telecommunications carrier that provides a communication service to the in-vehicle mobile station; a storage unit configured to store the SIM identification information and the telecommunications carrier identification information that are acquired by the first acquisition unit, in association with authentication information for authenticating a user of the in-vehicle mobile station; a first notification unit configured, upon detecting that a communication service contract is signed between the user and a telecommunications carrier identified by the telecommunications carrier identification information acquired by the first acquisition unit, to notify a communication device of the user of the authentication information; a second acquisition unit configured to acquire, from the in-vehicle mobile station, the SIM identification information of the in-vehicle mobile station: a second notification unit configured to notify the in-vehicle mobile station of the telecommunications carrier identification information and the authentication information which are stored in the storage unit in association with the SIM identification information acquired by the second acquisition unit; and an activation unit configured, upon detecting that authentication using the authentication information succeeds in the in-vehicle mobile station, to activate the SIM of the in-vehicle mobile station, in which a profile is written.

The communication device of the user may be a mobile station different from the in-vehicle mobile station, and the telecommunications carrier identification information may be an IC card identifier (ICCID) or an embedded identifier (eID) stored in a SIM of the mobile station.

The telecommunications carrier identification information may be a mobile network operator identifier (MNOID) for identifying a telecommunications carrier selected by the user.

The present invention also provides a communication system comprising: an in-vehicle mobile station; a communication device of a user; a contract information management device configured to write a profile in a SIM of the in-vehicle mobile station; a vehicle information management device configured to store SIM identification information of the SIM of the in-vehicle mobile station; and an information-processing device, wherein the information-processing device includes: a first acquisition unit configured to acquire, from the vehicle information management device, the SIM identification information of the SIM of the in-vehicle mobile station, and telecommunications carrier identification information for identifying a telecommunications carrier that provides a communication service to the in-vehicle mobile station; a storage unit configured to store the SIM identification information and the telecommunications carrier identification information that are acquired by the first acquisition unit, in association with authentication information for authenticating the user of the in-vehicle mobile station; a notification unit configured, upon detecting that a communication service contract is signed between the user and a telecommunications carrier identified by the telecommunications carrier identification information acquired by the first acquisition unit, to notify the communication device of the authentication information; a second acquisition unit configured to acquire, from the in-vehicle mobile station, authentication information input in the in-vehicle mobile station and the SIM identification information of the in-vehicle mobile station; an authentication unit configured to perform user authentication by checking the authentication information and the SIM identification information of the in-vehicle mobile station that are acquired by the second acquisition unit, against the authentication information and the SIM identification information of the in-vehicle mobile station that are stored in the storage unit; and an activation unit configured, upon detecting that the user authentication succeeds, to activate the SIM of the in-vehicle mobile station, in which a profile is written by the contract information management device.

The present invention also provides a communication system comprising: an in-vehicle mobile station; a communication device of a user; a contract information management device configured to write a profile in a SIM of the in-vehicle mobile station; a vehicle information management device configured to store SIM identification information of the SIM of the in-vehicle mobile station; and an information-processing device, wherein the information-processing device includes: a first acquisition unit configured to acquire, from the vehicle information management device, the SIM identification information of the SIM of the in-vehicle mobile station, and telecommunications carrier identification information for identifying a telecommunications carrier that provides a communication service to the in-vehicle mobile station; a storage unit configured to store the SIM identification information and the telecommunications carrier identification information that are acquired by the first acquisition unit, in association with authentication information for authenticating the user of the in-vehicle mobile station; a first notification unit configured, upon detecting that a communication service contract is signed between the user and a telecommunications carrier identified by the telecommunications carrier identification information acquired by the first acquisition unit, to notify the communication device of the authentication information; a second acquisition unit configured to acquire, from the in-vehicle mobile station, the SIM identification information of the in-vehicle mobile station; a second notification unit configured to notify the in-vehicle mobile station of the telecommunications carrier identification information which is stored in the storage unit in association with the SIM identification information acquired by the second acquisition unit; a third acquisition unit configured to acquire, from the in-vehicle mobile station, authentication information input in the in-vehicle mobile station, and the SIM identification information of the in-vehicle mobile station; an authentication unit configured to perform user authentication by checking the authentication information and the SIM identification information of the in-vehicle mobile station that are acquired by the third acquisition unit, against the authentication information and the SIM identification information of the in-vehicle mobile station that are stored in the storage unit; and an activation unit configured, upon detecting that the user authentication succeeds, to activate the SIM of the in-vehicle mobile station, in which a profile is written by the contract information management device.

The present invention also provides a communication system comprising: an in-vehicle mobile station; a communication device of a user; a contract information management device configured to write a profile in a SIM of the in-vehicle mobile station; a vehicle information management device configured to store SIM identification information of the SIM of the in-vehicle mobile station; and an information-processing device, wherein the information-processing device includes: a first acquisition unit configured to acquire, from the vehicle information management device, the SIM identification information of the SIM of the in-vehicle mobile station, and telecommunications carrier identification information for identifying a telecommunications carrier that provides a communication service to the in-vehicle mobile station; a storage unit configured to store the SIM identification information and the telecommunications carrier identification information that are acquired by the first acquisition unit, in association with authentication information for authenticating the user of the in-vehicle mobile station; a first notification unit configured, upon detecting that a communication service contract is signed between the user and a telecommunications carrier identified by the telecommunications carrier identification information acquired by the first acquisition unit, to notify the communication device of the authentication information; a second acquisition unit configured to acquire, from the in-vehicle mobile station, the SIM identification information of the in-vehicle mobile station: a second notification unit configured to notify the in-vehicle mobile station of the telecommunications carrier identification information and the authentication information which are stored in the storage unit in association with the SIM identification information acquired by the second acquisition unit; and an activation unit configured, upon detecting that authentication using the authentication information succeeds in the in-vehicle mobile station, to activate the SIM of the in-vehicle mobile station, in which a profile is written by the contract information management device.

According to the present invention, an in-vehicle mobile station can be made usable in an easy method.

BRIEF DESCRIPTION OF THE DRAWINGS

FIG. 6 is a diagram showing an example of information stored in vehicle information management device of FIG. 1.

FIG. 7 is a diagram showing an example of information stored in information-processing device of FIG. 1.

FIG. 8 is a diagram showing another example of information stored in information-processing device of FIG. 1.

FIG. 10 is a diagram showing an example of information stored in information-processing device in the second example of a profile registration operation according to an embodiment of the present invention.

FIG. 11 is a sequence chart showing a first example of a profile writing operation performed by communication system according to an embodiment of the present invention.

FIG. 18 is a diagram showing an example of information stored in information-processing device in the modified version according to an embodiment of the present invention.

FIG. 19 is a diagram showing an example of information stored in vehicle information management device in the modified version according to an embodiment of the present invention.

DETAILED DESCRIPTION

Figure 1:
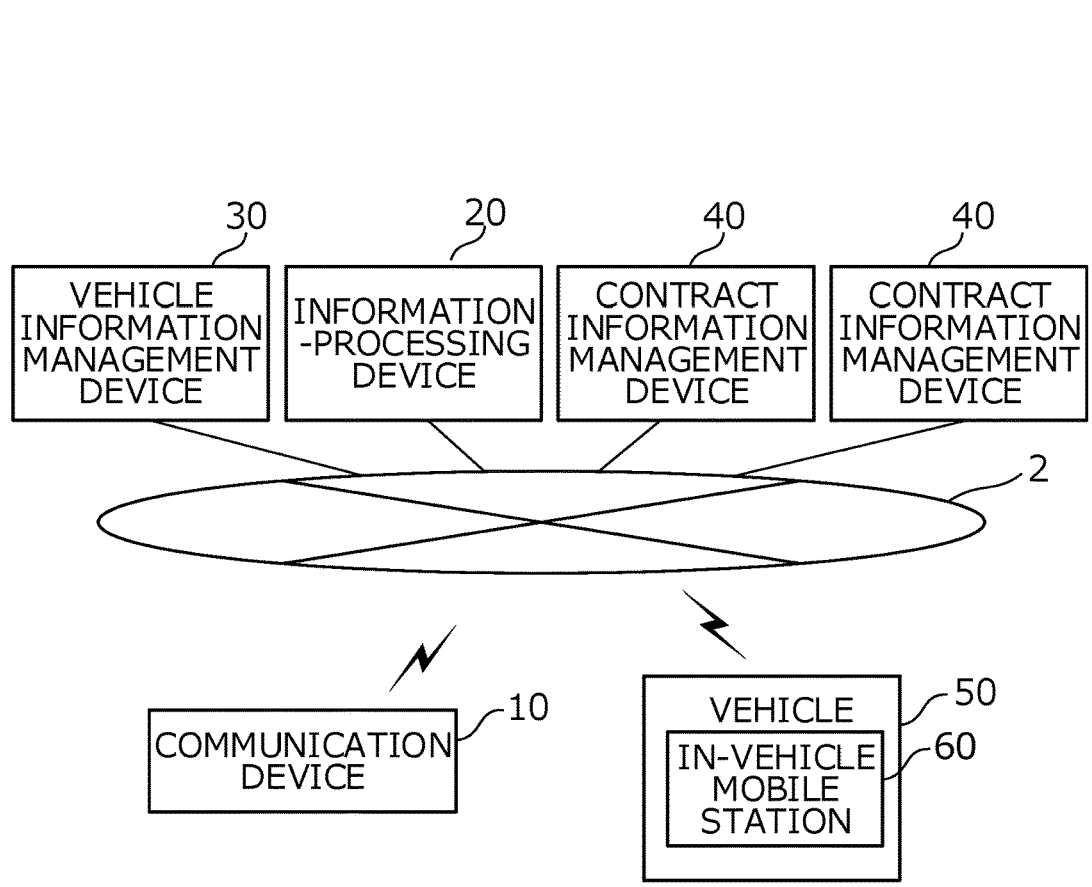
FIG. 1 is a diagram showing an example of a configuration of communication system according to an embodiment of the present invention.

FIG. 1 is a diagram showing an example of communication system 1 according to an embodiment of the present invention. The communication system 1 shown in the drawing includes communication device 10 used by a user, information-processing device 20 connected to communication device 10 via communication network 2, vehicle information management device 30, contract information management devices 40, and in-vehicle mobile station 60, which is a mobile station installed in vehicle 50. Communication network 2 includes, for example, a mobile communication network that conforms to the Long-Term Evolution (LTE) standard, and a fixed communication network such as the Internet.

Communication device 10 is a computer that includes a communication function, such as a mobile station or a personal computer for use by a user. Vehicle information management device 30 is, for example, a computer under control of a vehicle manufacturer for management of information about vehicle 50 such as information indicative of a correspondence between vehicle 50 and in-vehicle mobile station 60 installed in vehicle 50. In-vehicle mobile station 60 includes a subscriber identity module card (SIM) in which a profile is written via a mobile communication network included in communication network 2. Such a SIM in which a profile can be written remotely is referred to as an embedded SIM (eSIM), for example. Contract information management devices 40 are computers under control of a telecommunications carrier that provides a communication service to mobile stations via a mobile communication network included in communication network 2. Contract information management devices 40 have a function of storing information that relates to communication service contracts, and a function of writing a profile in the SIM of in-vehicle mobile station 60 via a mobile communication network. Contract information management devices 40 need not consist of a single device, and may consist of a plurality of devices. It is of note that the number of each of communication devices 10, information-processing devices 20, vehicle information management devices 30, contract information management devices 40, vehicles 50, and in-vehicle mobile stations 60 is not limited to those in the example shown in FIG. 1. In particular, there may be as many contract information management devices 40 as telecommunications carriers.

When the user purchases vehicle 50, s/he operates communication device 10 and in-vehicle mobile station 60 installed in vehicle 50 to write a profile in the SIM of in-vehicle mobile station 60 for activation. Specifically, the user initially operates communication device 10 to register a profile to be written in the SIM of in-vehicle mobile station 60, in contract information management device 40. Subsequently, the user operates in-vehicle mobile station 60 to write therein the profile registered in contract information management device 40 for activation.

Figure 2:
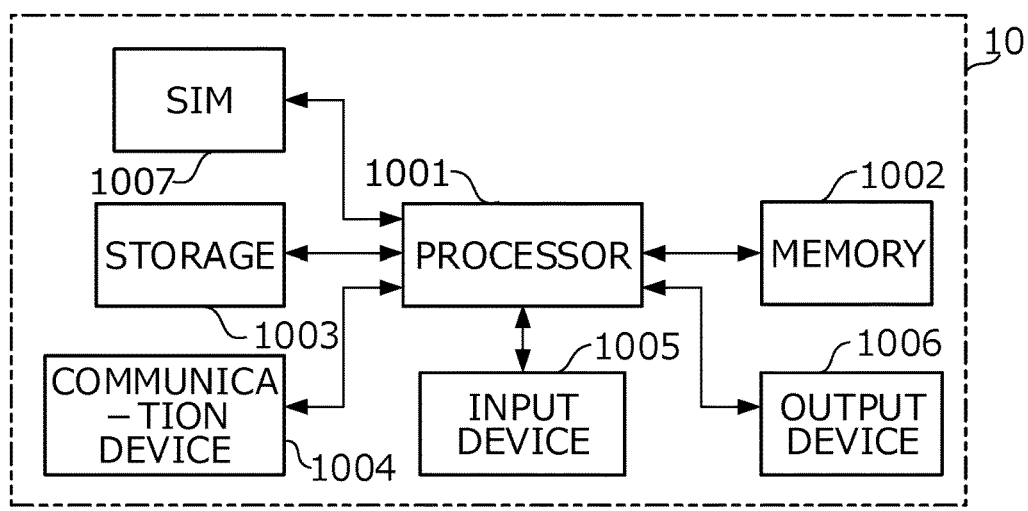
FIG. 2 is a block diagram showing an example of a hardware configuration of communication device of FIG. 1.

FIG. 2 is a diagram showing a hardware configuration of communication device 10. In the present embodiment, communication device 10 is assumed to be a mobile station. Communication device 10, which is a mobile station, is a physical computer that includes processor 1001, memory 1002, storage 1003, communication device 1004, input device 1005, output device 1006, SIM 1007, and a bus for connecting the devices. Each of the devices operates under power supplied by a battery (not shown). It is of note that in the following description, the term "device" may mean either a circuit or a unit. It is also of note that the number of each of the devices included in communication device 10 may be one or more, and communication device 10 may not include one or more of the devices listed above. It is of further note that communication device 10 may consist of networked devices, each of which is separately housed.

The functions of communication device 10 are provided by causing hardware such as processor 1001 and memory 1002 to read software (programs) so that processor 1001 performs calculations, causes communication device 1004 to perform communication, and controls at least one of reading and writing of data in memory 1002 or storage 1003.

Processor 1001 controls a computer, for example, by causing an operating system to run. Processor 1001 may include a central processing unit (CPU) that includes interfaces for connection to peripheral devices, a control device, an arithmetic device, and a register. Processor 1001 may also provide functions of a baseband signal processing unit and a call processing unit.

Processor 1001 retrieves a program (program code), a software module, and data from storage 1003 and/or communication device 1004 to memory 1002, and performs various processings thereon. The program retrieved by processor 1001 is used to cause a computer to execute at least a part of the operations described later. The functional blocks of communication device 10 may be provided upon execution by processor 1001 of a control program stored in memory 1002. A variety of processings may be performed by one or more processors 1001 either simultaneously or sequentially. Processor 1001 may consist of one or more chips. Programs may be transmitted to communication device 10 from communication network 2 via a telecommunication medium.

Memory 1002 is a computer-readable recording medium, and may include at least one of a read only memory (ROM), an erasable programmable ROM (EPROM), an electrically erasable programmable ROM (EEPROM), and a random-access memory (RAM). Memory 1002 may be referred to as a register, a cache, or a main memory (a main storage device). Memory 1002 is capable of storing programs (program code), software modules, and data required to carry out routines according to the present embodiment.

Storage 1003 is a computer-readable recording medium, and may be at least one of an optical disk such as a compact disk ROM (CD-ROM), a hard disk drive, a flexible disk, an optical magnetic disk (for example, a compact disk, a digital versatile disk, or a Blu-ray (registered trademark) disk), a smart card, a flash memory (for example, a card, a stick, or a key drive), a floppy (registered trademark) disk, and a magnetic strip. Storage 1003 may be referred to as an auxiliary storage device. Storage 1003 stores programs in which procedures are detailed for causing communication device 10 to perform operations described later.

Communication device 1004 is hardware (a transmission/reception device) that enables communication between computers via a mobile communication network, and is also referred to as, for example, a network device, a network controller, a network card, or a communication module. Communication device 1004 may include a high frequency switch, a duplexer, a filter, and a frequency synthesizer to enable at least one of frequency division duplex (FDD) and time division duplex (TDD). Communication device 1004 may also provide a transmission/reception antenna, an amplifier unit, a transmission/reception unit, and a transmission line interface. The transmission/reception unit provided by communication device 1004 may consist of a transmission unit and a reception unit that are physically or logically separate from each other.

Input device 1005 is an input device for receiving input from, for example, keys, a microphone, switches, buttons, or a camera. Output device 1006 is a device for providing output from, for example, a display, a speaker, or an LED lamp.

SIM 1007 is an integrated circuit (IC) card for storing a profile that is required by communication device 10, which is a mobile station, to use a communication service. In a case that communication device 10 is a mobile station, SIM 1007 may refer to an eSIM in which a profile can be written remotely, or to a conventional SIM in which a profile cannot be written remotely. An eSIM is capable of storing SIM identification information that is referred to as an embedded identifier (eID). A conventional SIM is capable of storing SIM identification information, referred to as IC card identifier (ICCID). Both an eID and an ICCID include telecommunications carrier identification information for identifying a telecommunications carrier. For example, an ICCID is a maximum 19-digit number, in which a first two-digit number represents a telecommunications industry, and a subsequent five-digit number is a combination of a country code and an identification number of a telecommunications carrier. The five-digit number corresponds to the telecommunications carrier identification information. An eSIM includes the telecommunications carrier identification information in a similar manner.

The devices such as processor 1001 and memory 1002 are connected by a bus that enables communication. Either a single bus or multiple buses may be used.

Communication device 10 may include hardware such as a microprocessor, a digital signal processor (DSP), an application specific integrated circuit (ASIC), a programmable logic device (PLD), or a field programmable gate array (FPGA). Such hardware may provide some or all of the functional blocks. For example, processor 1001 may consist of at least one of the items of the hardware. It is also of note that the number of each of the devices included in communication device 10 may be one or more, and that communication device 10 may lack some of the devices. It is also of note that communication device 10 may consist of networked devices, each of which is separately housed.

It is of note that in a case where communication device 10 is a personal computer, communication device 10 is a physical device that includes processor 1001, memory 1002, storage 1003, communication device 1004, input device 1005, output device 1006, and a bus for connecting the devices, which are shown in FIG. 2. Communication device 10 need not include SIM 1007.

Figure 3:
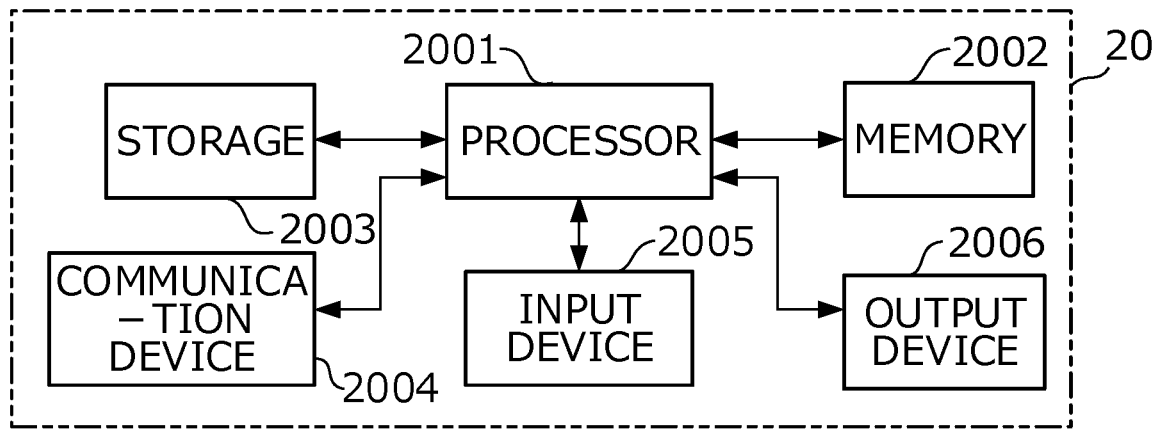
FIG. 3 is a block diagram showing an example of a hardware configuration of information-processing device of FIG. 1.

FIG. 3 is a diagram showing a hardware configuration of information-processing device 20. Information-processing device 20 is a physical computer that includes processor 2001, memory 2002, storage 2003, communication device 2004, input device 2005, output device 2006, and a bus for connecting the devices. The functions of information-processing device 20 are provided by causing hardware such as processor 2001 and memory 2002 to read software (programs) so that processor 2001 performs calculations, causes communication device 2004 to perform communication, and controls at least one of reading and writing of data in memory 2002 or storage 2003. As hardware, processor 2001, memory 2002, storage 2003, communication device 2004, input device 2005, output device 2006, and the bus are similar respectively to processor 1001, memory 1002, storage 1003, communication device 1004, input device 1005, output device 1006, and the bus included in communication device 10; accordingly, description of the devices of information-processing device 20 is omitted. It is of note that the number of each of the devices included in information-processing device 20 may be one or more, and that information-processing device 20 may not include one or more of the devices. It is also of note that information-processing device 20 may consist of networked devices, each of which is separately housed.

The hardware configuration of vehicle information management device 30 and contract information management device 40 is the same as that of information-processing device 20; accordingly, description of the hardware configuration is omitted.

Figure 4:
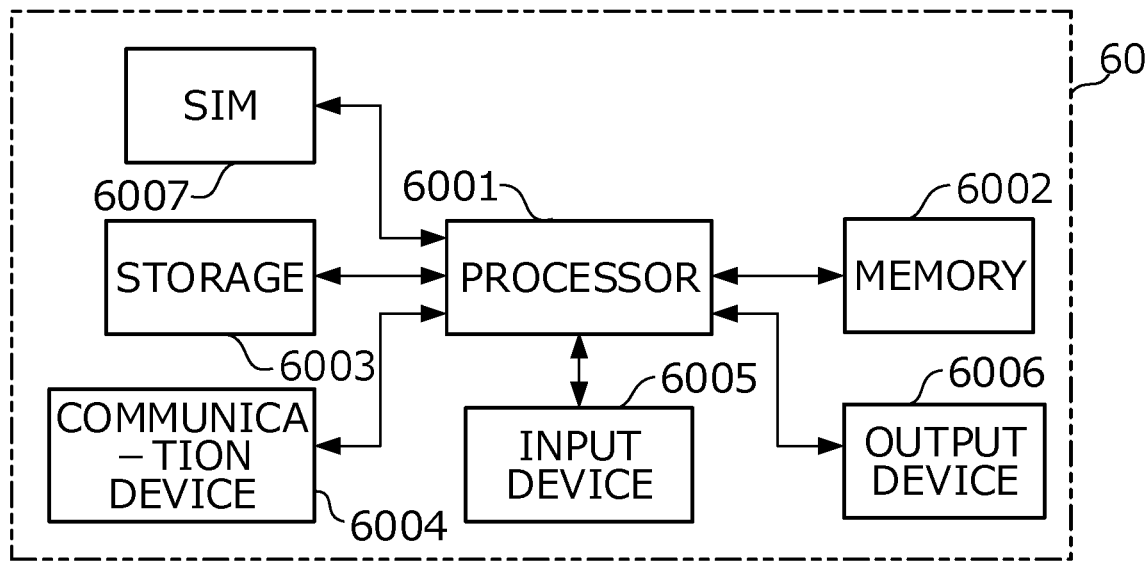
FIG. 4 is a block diagram showing an example of a hardware configuration of in-vehicle mobile station of FIG. 1.

FIG. 4 is a diagram showing a hardware configuration of in-vehicle mobile station 60, which is, for example, a computer included in an in-vehicle device such as a car navigation device. In-vehicle mobile station 60 consists of a physical computer that includes processor 6001, memory 6002, storage 6003, communication device 6004, input device 6005, output device 6006, SIM 6007, and a bus for connecting the devices. The functions of in-vehicle mobile station 60 are provided by causing hardware such as processor 6001 and memory 6002 to read software (programs) so that processor 6001 performs calculations, causes communication device 6004 to perform communication, and controls at least one of reading and writing of data in memory 6002 or storage 6003. As hardware, processor 6001, memory 6002, storage 6003, communication device 6004, input device 6005, output device 6006, and the bus are similar respectively to processor 1001, memory 1002, storage 1003, communication device 1004, input device 1005, output device 1006, and the bus included in communication device 10; accordingly, description of the devices of in-vehicle mobile station 60 is omitted. SIM 6007 is an eSIM in which a profile can be written remotely. SIM 6007 is capable of storing SIM identification information that is referred to as an eID.

Operations of communication system 1 will now be described. Generally, operations of communication system 1 are divided into: (1) a profile registration operation in which the user operates communication device 10 to register a profile to be written in in-vehicle mobile station 60, in contract information management device 40; and (2) a profile writing operation in which the user operates the vehicle mobile station 60 to write a profile registered in contract information management device 40, in in-vehicle mobile station 60 for activation. In the following, two examples of (1) the profile registration operation and three examples of (2) the profile writing operation will be described. It is of note that the two examples of (1) the profile registration operation and the three examples of (2) the profile writing operation may be freely combined.

In the following, description of information-processing device 20 with respect to processing indicates that processing is carried out by causing hardware such as processor 2001 and memory 2002 to read software (programs) so that processor 2001 performs calculations, causes communication device 2004 to perform communication, and controls at least one of reading and writing of data in memory 2002 or storage 2003. The same applies to communication device 10, vehicle information management device 30, contract information management device 40, and in-vehicle mobile station 60.

(1-1) First Example of Profile Registration Operation

Figure 5:
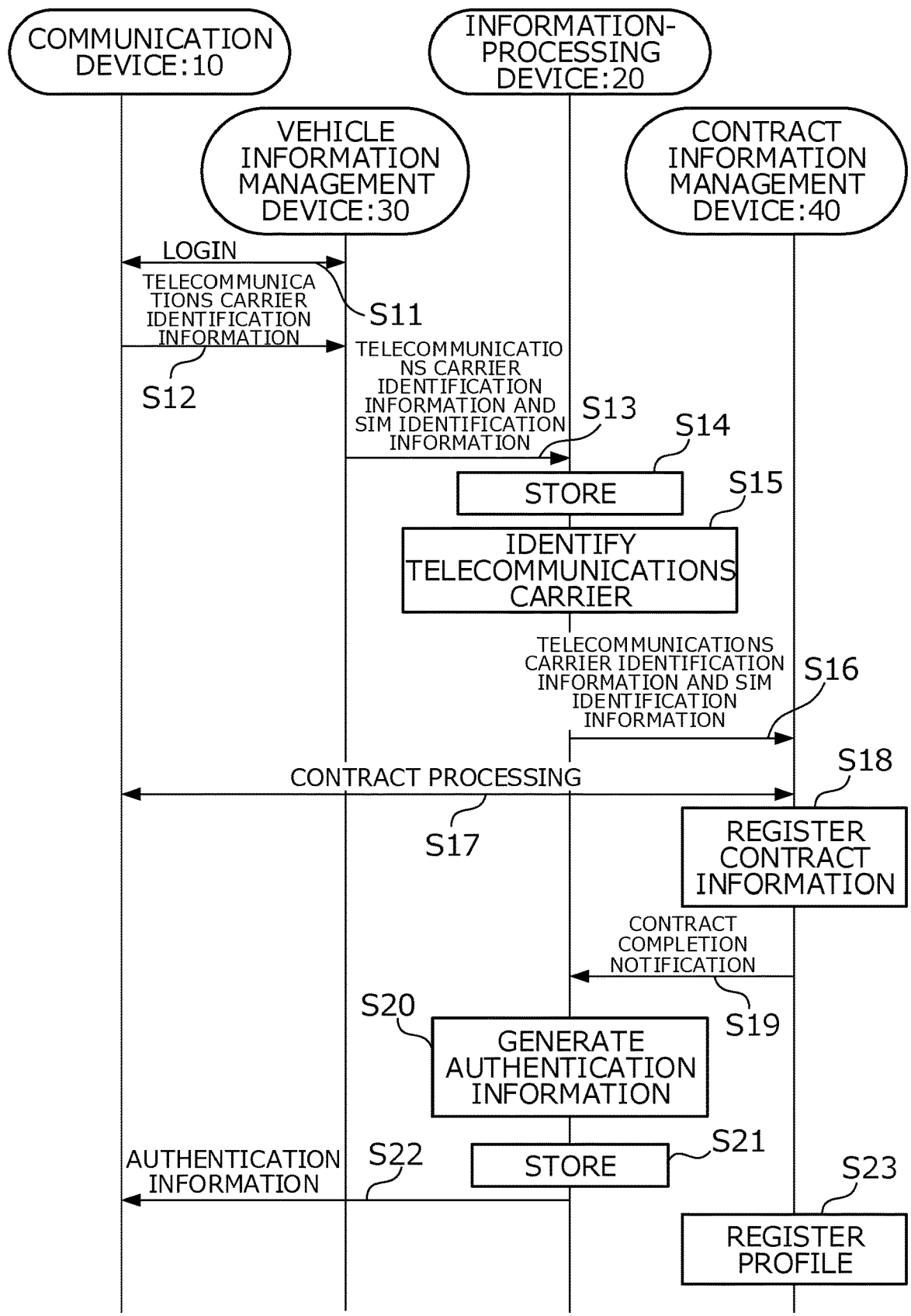
FIG. 5 is a sequence chart showing a first example of a profile registration operation performed by communication system according to an embodiment of the present invention.

FIG. 5 is a sequence chart showing a first example of a profile registration operation. In the first example shown in the drawing it is assumed that communication device 10 is a mobile station, and the user signs a communication service contract for in-vehicle mobile station 60 installed in his/her vehicle 50, with a telecommunications carrier that provides a communication service to communication device 10 (mobile station).

As shown in FIG. 5, the user accesses vehicle information management device 30 by use of communication device 10, which is a mobile station, to log in with, for example, a user ID and a password (step S11). In the storage of vehicle information management device 30 there is pre-stored for each user a user ID for identifying a user, vehicle identification information (for example, "C001") for identifying vehicle 50 purchased by a user, and SIM identification information (for example, "eID001") for identifying SIM 6007 of in-vehicle mobile station 60 installed in vehicle 50, as shown in FIG. 6. When the user logs in to vehicle information management device 30 with his/her user ID, vehicle information management device 30 identifies, based on the user ID, vehicle 50 purchased by the user and SIM 6007 of in-vehicle mobile station 60 installed in the vehicle 50.

Upon login to vehicle information management device 30, communication device 10 retrieves SIM identification information from its SIM 1007 to send it to vehicle information management device 30. The SIM identification information sent to vehicle information management device 30, which is assumed to be an ICCID, corresponds to the telecommunications carrier identification information that identifies a telecommunications carrier, as described above. In other words, communication device 10 sends the telecommunications carrier identification information (for example, "ICCID001") of a telecommunications carrier that provides a communication service to communication device 10, to vehicle information management device 30 (step S12).

When vehicle information management device 30 acquires the telecommunications carrier identification information (for example, "ICCID001"), the device sends the telecommunications carrier identification information to information-processing device 20, together with SIM identification information (for example, "eID001") of the SIM 6007 of the user's in-vehicle mobile station 60 identified by vehicle information management device 30 (step S13).

When information-processing device 20 acquires the telecommunications carrier identification information (for example, "ICCID001") and the SIM identification information (for example, "eID001"), the device stores the information in association with each other in storage 2003, as shown in FIG. 7 (step S14). As shown in the drawing, information-processing device 20 is configured to store contract existence information and authentication information in association with the telecommunications carrier identification information and SIM identification information. Contract existence information is information indicative of whether a user has signed a communication service contract with a telecommunications carrier. Authentication information is information for authenticating a user in (2) a profile writing operation. If at step S14 the telecommunications carrier identification information and the SIM identification information are associated with contract existence information "exist," information-processing device 20 notifies vehicle information management device 30 or communication device 10 of existence of a communication service contract.

Subsequently, information-processing device 20 analyzes the telecommunications carrier identification information to identify a telecommunications carrier (step S15), which provides a communication service to communication device 10, which is a mobile station. Information-processing device 20 pre-stores, in storage 2003, communication addresses (connection destinations) of contract information management devices 40 of telecommunications carriers. Information-processing device 20 sends the telecommunications carrier identification information (for example, "ICCID001") and the SIM identification information (for example, "eID001") to contract information management device 40 of the identified telecommunications carrier (step S16).

When the contract information management device 40 acquires the telecommunications carrier identification information (for example, "ICCID001") and the SIM identification information (for example, "eID001"), the device performs, based on the information, processing for contracting a communication service using a mobile communication network corresponding to communication device 10 (step S17). In the processing, for example, the contract information management device 40 requests the user of communication device 10 to input information for personal identification. After completing the processing, the contract information management device 40 registers contract information in its storage (step S18). After completing the registration, the contract information management device 40 sends a contract completion notification to information-processing device 20 (step S19). Subsequently, the contract information management device 40 registers, in its storage, a profile to be written in the SIM 6007 identified by the SIM identification information (for example, "eID001"), in association with the SIM identification information (step S23).

When information-processing device 20 receives the contract completion notification, the device generates authentication information (for example, "PASS001") such as a password in accordance with a predetermined algorithm (step S20). Subsequently, information-processing device 20 stores, in storage 2003, the generated authentication information (for example, "PASS001") in association with the telecommunications carrier identification information (for example, "ICCID001") and the SIM identification information (for example, "eID001"), as shown in FIG. 8 (step S21). At the same time, information-processing device 20 stores contract existence information "exist." Subsequently, information-processing device 20 sends the stored authentication information to communication device 10 (step S22). When communication device 10 acquires the authentication information, the device presents the information to the user, for example, by displaying the information.

(1-2) Second Example of Profile Registration Operation

Figure 9:
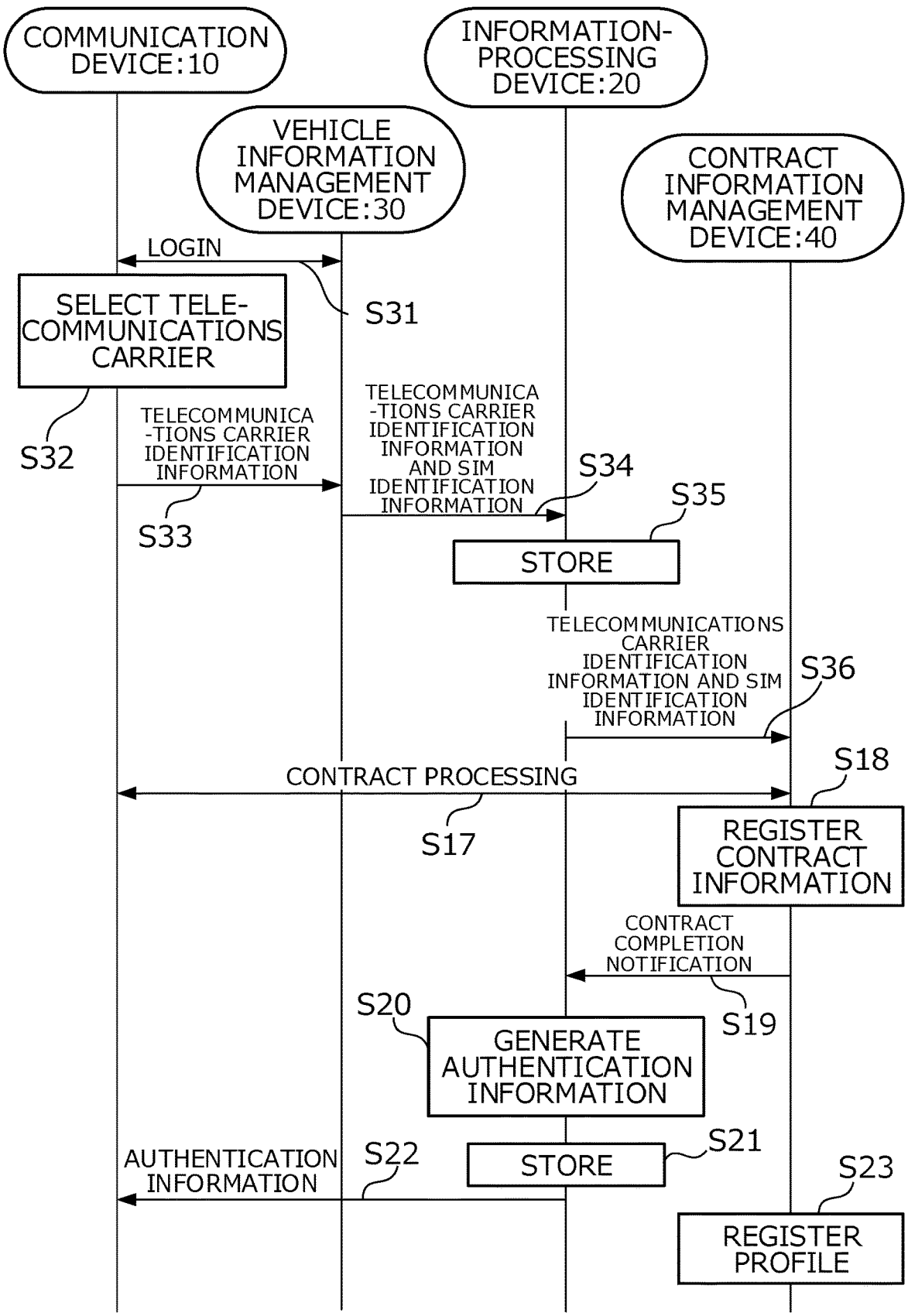
FIG. 9 is a sequence chart showing a second example of a profile registration operation performed by communication system according to an embodiment of the present invention.

FIG. 9 is a sequence chart showing a second example of a profile registration operation. In the first example of a profile registration operation, it is assumed that communication device 10 is a mobile station, whereas in the second example, communication device 10 may refer to a mobile station or a personal computer. In the first example, it is assumed that the user signs a communication service contract for in-vehicle mobile station 60 installed in his/her vehicle, with a telecommunications carrier that provides a communication service to communication device 10 (mobile station), whereas in the second example, communication device 10 may sign a communication service contract for in-vehicle mobile station 60 with any one of desired telecommunications carriers.

As shown in FIG. 9, the user accesses vehicle information management device 30 by use of communication device 10 to log in with, for example, a user ID and a password (step S31). Vehicle information management device 30 pre-stores, for each of the users, a set of vehicle identification information (for example, "C001") for identifying vehicle 50 purchased by a user and SIM identification information (for example, "eID001") for identifying SIM 6007 of in-vehicle mobile station 60 installed in vehicle 50, as in the case of the first example (see FIG. 6). When the user logs in to vehicle information management device 30, vehicle information management device 30 identifies the user to identify vehicle 50 purchased by the user and SIM 6007 of in-vehicle mobile station 60 installed in the vehicle 50.

After logging in to vehicle information management device 30, the user operates communication device 10 to select a desired telecommunications carrier as a provider of a communication service for the in-vehicle mobile station 60. To make the user's selection easier, vehicle information management device 30 may cause communication device 10 to display a list of telecommunication carriers. When communication device 10 accepts the user's selection (step S32), the device sends the telecommunications carrier identification information for identifying selected telecommunications carrier, to vehicle information management device 30 (step S33). The telecommunications carrier identification information sent to vehicle information management device 30 is assumed to be a mobile network operator identifier (MNOID) (for example, "MNOID001").

When vehicle information management device 30 acquires the telecommunications carrier identification information (for example, "MNOID001"), the device sends the telecommunications carrier identification information to information-processing device 20, together with SIM identification information (for example, "eID001") of the user's in-vehicle mobile station 60, which has been identified by vehicle information management device 30 (step S34).

When information-processing device 20 acquires the telecommunications carrier identification information (for example, "MNOID001") and the SIM identification information (for example, "eID001"), the device stores the information in association with each other, as shown in FIG. 10 (step S35). Subsequently, information-processing device 20 sends the telecommunications carrier identification information (for example, "MNOID001") and the SIM identification information (for example, "eID001") to contract information management device 40 of the telecommunications carrier that is identified by the telecommunications carrier identification information (step S36). After that, steps S17 to S23 are carried out, as in the case of the first example.

As a result of the profile registration operations described in the foregoing, the contract information management device 40 stores the SIM identification information of the SIM 6007 of the in-vehicle mobile station 60 and the profile to be written in the SIM 6007, in association with each other.

Subsequently, an operation for writing the profile stored in the contract information management device 40, in the SIM 6007 of the in-vehicle mobile station 60 will be described.

(2-1) First Example of Profile Writing Operation

FIG. 11 is a sequence chart showing a first example of a profile writing operation.

A SIM in which a profile can be written remotely, such as an eSIM, is divided into two types: a consumer eSIM and an M2M eSIM (or telematics eSIM). A consumer eSIM is an eSIM for which a communication service contract is signed by an individual user. This consumer eSIM is configured not to allow communication using a mobile communication network until a communication service contract is signed. The SIMS of communication device 10 described in the foregoing are consumer eSIMs. On the other hand, an M2M eSIM is an eSIM for which a communication service contract is signed by a corporate user. This M2M eSIM is configured, before shipment, to allow communication using a mobile communication network. In the profile writing operation described below, it is assumed that the SIM 6007 of in-vehicle mobile station 60 has both the function of a consumer eSIM and the function of an M2M eSIM. In the profile writing operation, a profile is written in a consumer eSIM that is contracted by the user of communication device 10 and in-vehicle mobile station 60. This writing operation is performed using a communication function of an M2M eSIM for which a communication service contract has been signed by a vehicle manufacturer, which is a corporation.

In-vehicle mobile station 60 has a function of receiving base station information from a base station of a mobile communication network, and presenting, based on the received base station information, telecommunications carriers that can provide a communication service to the in-vehicle mobile station 60. The telecommunications carriers presented by the in-vehicle mobile station 60 are, in other words, carriers whose coverage area includes a present location of the in-vehicle mobile station 60. As shown in FIG. 11, when in-vehicle mobile station 60 presents a list of telecommunications carriers to a user, for example, by displaying it (step S41), the user selects, from the list, a desired telecommunications carrier as a provider of a communication service for the in-vehicle mobile station 60. When the in-vehicle mobile station 60 performs the presentation, the mobile station may measure its location by use of a positioning function such as a global positioning system (GPS) function, and present a list of telecommunications carriers whose coverage area includes the measured location.

When the in-vehicle mobile station 60 accepts the user's selection (step S42), the mobile station writes, in a storage area for an M2M eSIM of its SIM 6007, a communication address of contract information management device 40 of the selected telecommunications carrier as a connection destination (step S43). It is of note that the in-vehicle mobile station 60 pre-stores a list of communication addresses of contract information management devices 40 of telecommunications carriers. When the in-vehicle mobile station 60 accepts the user's selection, the mobile station refers to the list to write a communication address of contract information management device 40 of the selected telecommunications carrier.

Subsequently, the in-vehicle mobile station 60 connects to the contract information management device 40 by use of the communication address written in the SIM 6007 to notify the contract information management device 40 of SIM identification information of the SIM 6007. When doing so, the in-vehicle mobile station 60 uses a communication function of an M2M eSIM of the SIM 6007. In response to the notification, the contract information management device 40 writes a profile corresponding to the SIM identification information in the SIM 6007 of the in-vehicle mobile station 60 (step S44). More specifically, the contract information management device 40 initially sends a profile corresponding to the SIM identification information of a consumer eSIM of the SIM 6007 to the in-vehicle mobile station 60. When doing so, the contract information management device 40 uses the communication function of the M2M eSIM of the SIM 6007. When the in-vehicle mobile station 60 receives the profile, the mobile station writes it in a storage area for the consumer eSIM of the SIM 6007.

Subsequently, the in-vehicle mobile station 60 prompts the user to input authentication information, and accepts a user's operation to input authentication information (step S45). The in-vehicle mobile station 60 pre-stores a communication address of information-processing device 20 in storage 6003. By using the pre-stored communication address, the in-vehicle mobile station 60 sends the input authentication information to information-processing device 20, together with the SIM identification information of the SIM 6007 (step S46). When doing so, the in-vehicle mobile station uses the communication function of the M2M eSIM.

When information-processing device 20 acquires the authentication information and the SIM identification information from the in-vehicle mobile station 60, the device performs authentication by checking the authentication information against authentication that is stored in association with the SIM identification information (step S47). After completing the authentication, information-processing device 20 sends a result of the authentication to the in-vehicle mobile station 60 by use of the communication function of the M2M eSIM of the SIM 6007 (step S48). When the authentication succeeds, the in-vehicle mobile station 60 activates the profile written in the storage area for the consumer eSIM of the SIM 6007. On the other hand, when the authentication fails, the in-vehicle mobile station 60 deactivates the profile (step S49). Accordingly, the SIM 6007 can be activated by only a valid user who knows the registered authentication information.

(2-2) Second Example of Profile Writing Operation

Figure 12:
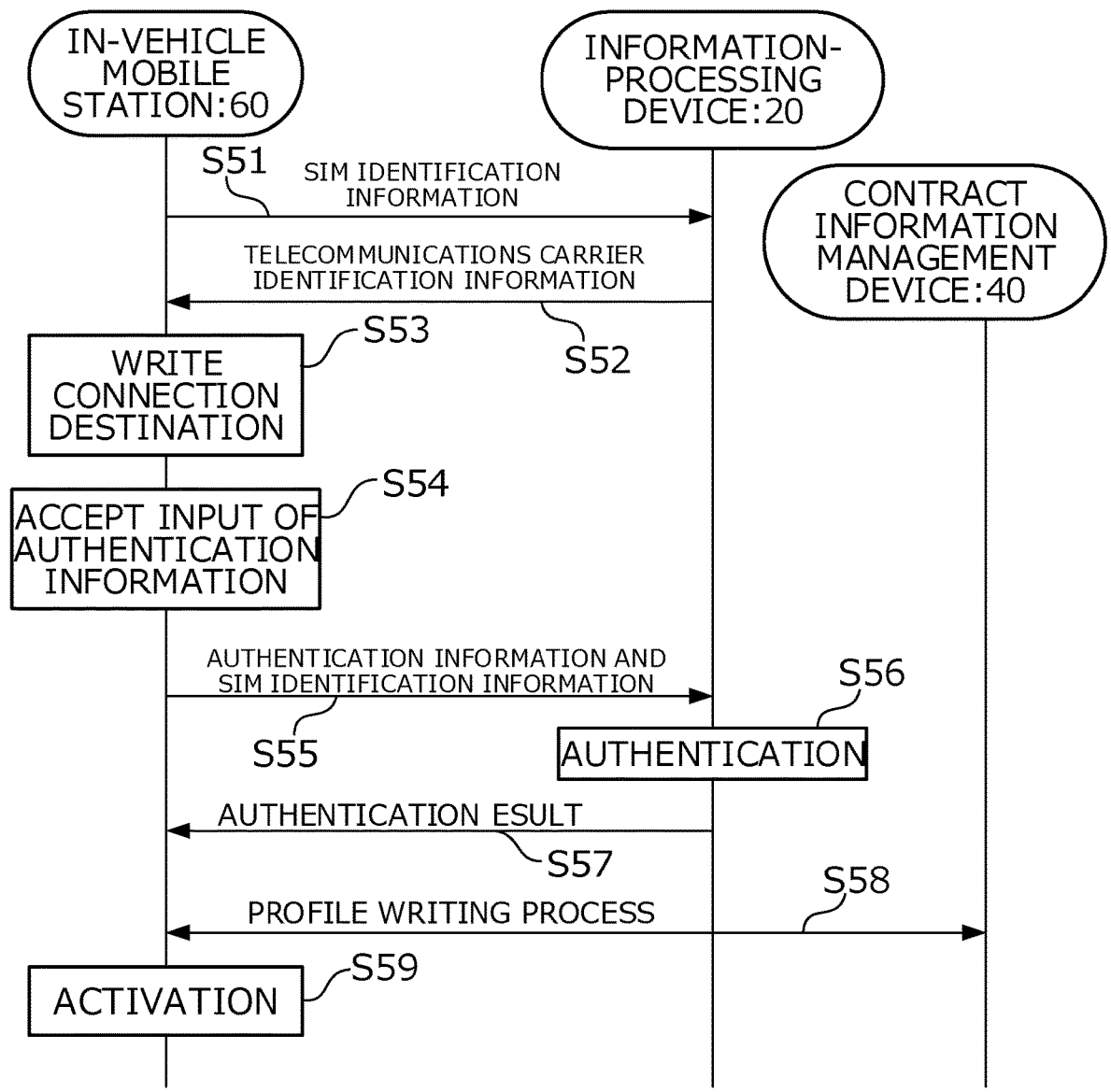
FIG. 12 is a sequence chart showing a second example of a profile writing operation performed by communication system according to an embodiment of the present invention.

FIG. 12 is a sequence chart showing a second example of a profile writing operation. The second example shown in the drawing is similar to the first example in that the SIM 6007 of in-vehicle mobile station 60 is assumed to have both the function of a consumer eSIM and the function of an M2M eSIM, and that a profile is written in a consumer eSIM by use of a communication function of an M2M eSIM. As shown in FIG. 12, in-vehicle mobile station 60 sends SIM identification information of a consumer eSIM to information-processing device 20 by use of a communication function of an M2M eSIM (step S51). When information-processing device 20 receives the SIM identification information, the device identifies a telecommunications carrier based on the SIM identification information. After identifying the telecommunications carrier, information-processing device 20 identifies the telecommunications carrier identification information of the identified telecommunications carrier. The identified telecommunications carrier identification information is, specifically, a communication address of contract information management device 40 of the telecommunications carrier. After identifying the telecommunications carrier identification information, information-processing device 20 sends the information to the in-vehicle mobile station 60 (step S52). When the in-vehicle mobile station 60 receives the telecommunications carrier identification information, the mobile station writes the communication address of the contract information management device 40, as a connection destination, in a storage area for the consumer eSIM of its SIM 6007 (step S53).

Subsequently, the in-vehicle mobile station 60 prompts the user to input authentication information, and accepts a user's operation to input authentication information (step S54). The in-vehicle mobile station 60 sends the input authentication information to information-processing device 20, together with the SIM identification information of the consumer eSIM of the SIM 6007 (step S55). When doing so, the in-vehicle mobile station uses the communication function of the M2M eSIM.

When information-processing device 20 acquires the authentication information and the SIM identification information from the in-vehicle mobile station 60, the device performs authentication by checking the authentication information against authentication that is stored in association with the SIM identification information (step S56). After completing the authentication, information-processing device 20 sends a result of the authentication to the in-vehicle mobile station 60 by use of the communication function of the M2M eSIM of the SIM 6007 (step S57).

When the authentication succeeds, the in-vehicle mobile station 60 connects to the contract information management device 40 by use of the communication address written in the storage area for the consumer eSIM of the SIM 6007 to notify the contract information management device 40 of the SIM identification information of the consumer eSIM. When doing so, the in-vehicle mobile station 60 uses a function of the consumer eSIM. In response to the notification, the contract information management device 40 writes a profile corresponding to the SIM identification information in the storage area for the consumer eSIM of the SIM 6007 (step S58). More specifically, the contract information management device 40 initially sends a profile corresponding to the SIM identification information of the consumer eSIM of the SIM 6007 to the in-vehicle mobile station 60. When doing so, the contract information management device 40 uses the communication function of the M2M eSIM of the SIM 6007. When the in-vehicle mobile station 60 receives the profile, the mobile station writes it in the storage area for the consumer eSIM of the SIM 6007.

When the authentication succeeds, the in-vehicle mobile station 60 activates the profile written in the storage area for the consumer eSIM of the SIM 6007 (step S59). Accordingly, the SIM 6007 can be activated by only a valid user who knows the registered authentication information.

(2-3) Third Example of Profile Writing Operation

Figure 13:
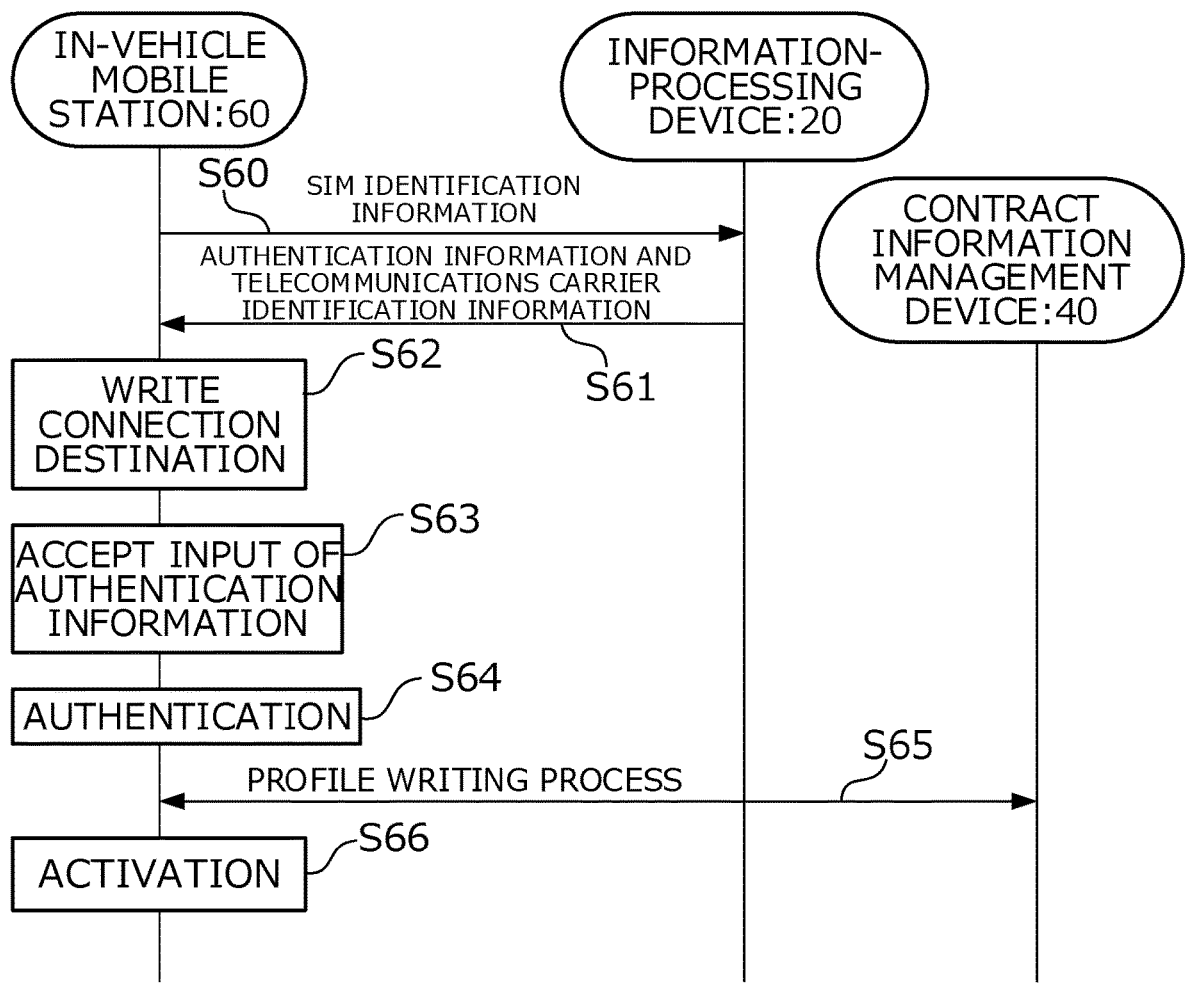
FIG. 13 is a sequence chart showing a third example of a profile writing operation performed by communication system according to an embodiment of the present invention.

FIG. 13 is a sequence chart showing a third example of a profile writing operation. The third example shown in the drawing is similar to the first example in that the SIM 6007 of in-vehicle mobile station 60 is assumed to have both the function of a consumer eSIM and the function of an M2M eSIM, and that a profile is written in a consumer eSIM by use of a communication function of an M2M eSIM.

As shown in FIG. 13, in-vehicle mobile station 60 sends SIM identification information of a consumer eSIM to information-processing device 20 by use of a communication function of an M2M eSIM (step S60). When information-processing device 20 receives the SIM identification information, the device identifies authentication information and the telecommunications carrier identification information that are stored in association with the received SIM identification information. The identified telecommunications carrier identification information is, specifically, a communication address of contract information management device 40 of a telecommunications carrier. After identifying the authentication information and the telecommunications carrier identification information, information-processing device 20 sends the information to the M2M eSIM of the SIM 6007 (step S61). When the in-vehicle mobile station 60 receives the authentication information and the telecommunications carrier identification information, the mobile station writes the communication address of the contract information management device 40, as a connection destination, in a storage area for the consumer eSIM of the SIM 6007 (step S62).

Subsequently, the in-vehicle mobile station 60 prompts a user to input authentication information, and accepts a user's operation to input authentication information (step S63). After accepting the user's operation, the in-vehicle mobile station 60 performs authentication by checking the input authentication information against the authentication acquired from information-processing device 20 (step S64). When the authentication succeeds, the in-vehicle mobile station 60 connects to the contract information management device 40 by use of the communication address written in the SIM 6007 to notify the contract information management device 40 of the SIM identification information of the consumer eSIM. When doing so, the in-vehicle mobile station 60 uses the communication function of the M2M eSIM. In response to the notification, the contract information management device 40 writes a profile corresponding to the SIM identification information in the storage area for the consumer eSIM of the SIM 6007 (step S65). When the authentication succeeds, the in-vehicle mobile station 60 activates the profile written in the SIM 6007 (step S66). Accordingly, the SIM 6007 can be activated by only a valid user who knows the registered authentication information.

Now, functional configurations of communication system 1 will be described.

Figure 14:
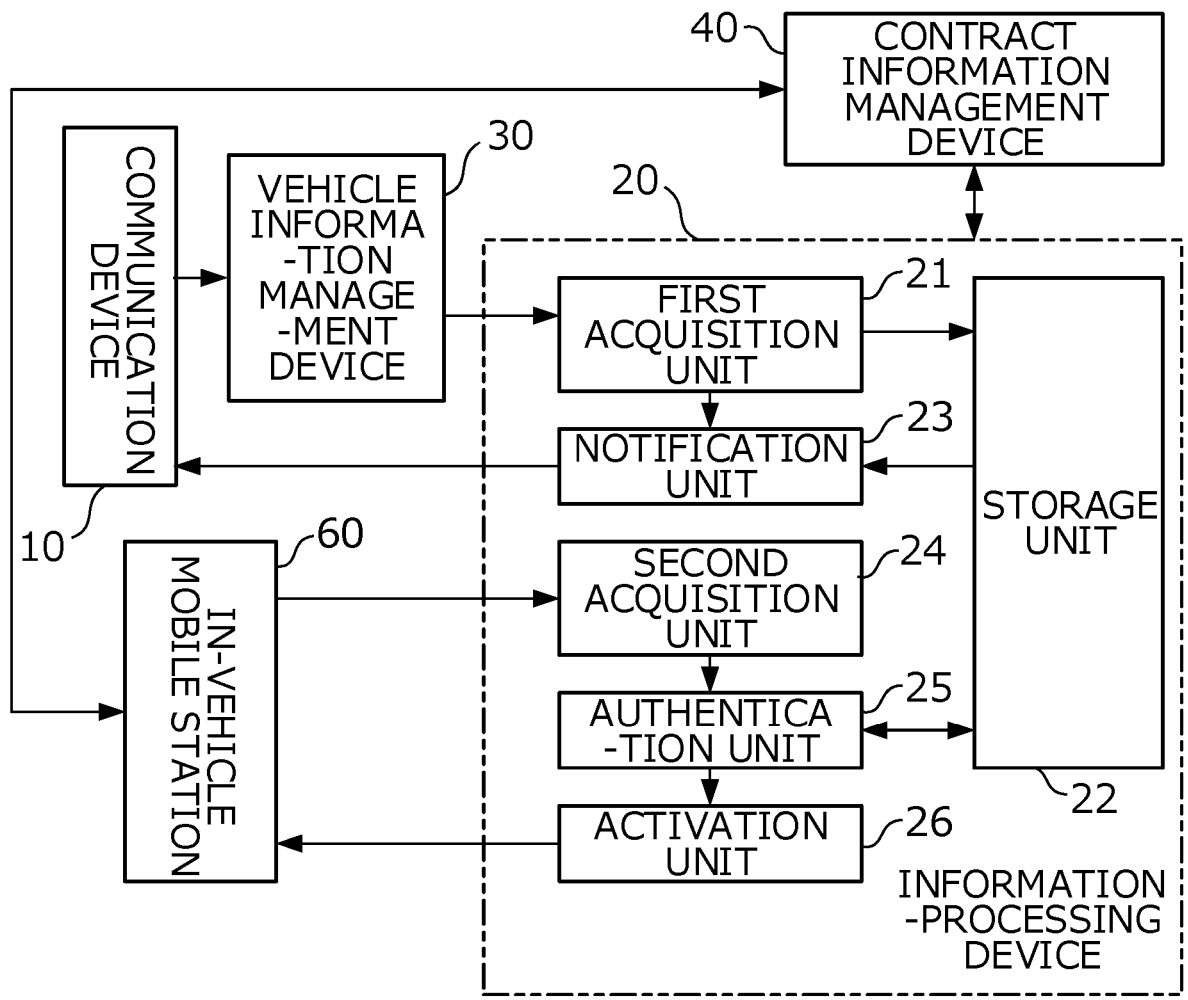
FIG. 14 is a block diagram showing a first example of a functional configuration of communication system according to an embodiment of the present invention.

FIG. 14 is a block diagram showing a functional configuration for carrying out (1-1) the first example of a profile registration operation or (1-2) the second example of a profile registration operation, and (2-1) the first example of a profile writing operation. In information-processing device 20 shown in the drawing, first acquisition unit 21 is configured to acquire, from vehicle information management device 30, SIM identification information of the SIM 6007 of in-vehicle mobile station 60, and the telecommunications carrier identification information for identifying a telecommunications carrier that provides a communication service to the in-vehicle mobile station 60. Storage unit 22 is configured to store the SIM identification information and the telecommunications carrier identification information that are acquired by first acquisition unit 21, in association with authentication information for authenticating a user of the in-vehicle mobile station 60. Notification unit 23 is configured, upon detecting that a communication service contract is signed between the user and a telecommunications carrier identified by the telecommunications carrier identification information acquired by first acquisition unit 21, to notify communication device 10 of the authentication information. Second acquisition unit 24 is configured to acquire, from the in-vehicle mobile station 60, authentication information input in the in-vehicle mobile station 60 and the SIM identification information of the in-vehicle mobile station 60. Authentication unit 25 is configured to perform user authentication by checking the authentication information and the SIM identification information of the in-vehicle mobile station 60 that are acquired by second acquisition unit 24, against the authentication information and the SIM identification information of the in-vehicle mobile station 60 that are stored in storage unit 22. Activation unit 26 is configured, upon detecting that the user authentication succeeds, to activate the SIM 6007 of the in-vehicle mobile station 60 in which a profile is written by contract information management device 40.

Figure 15:
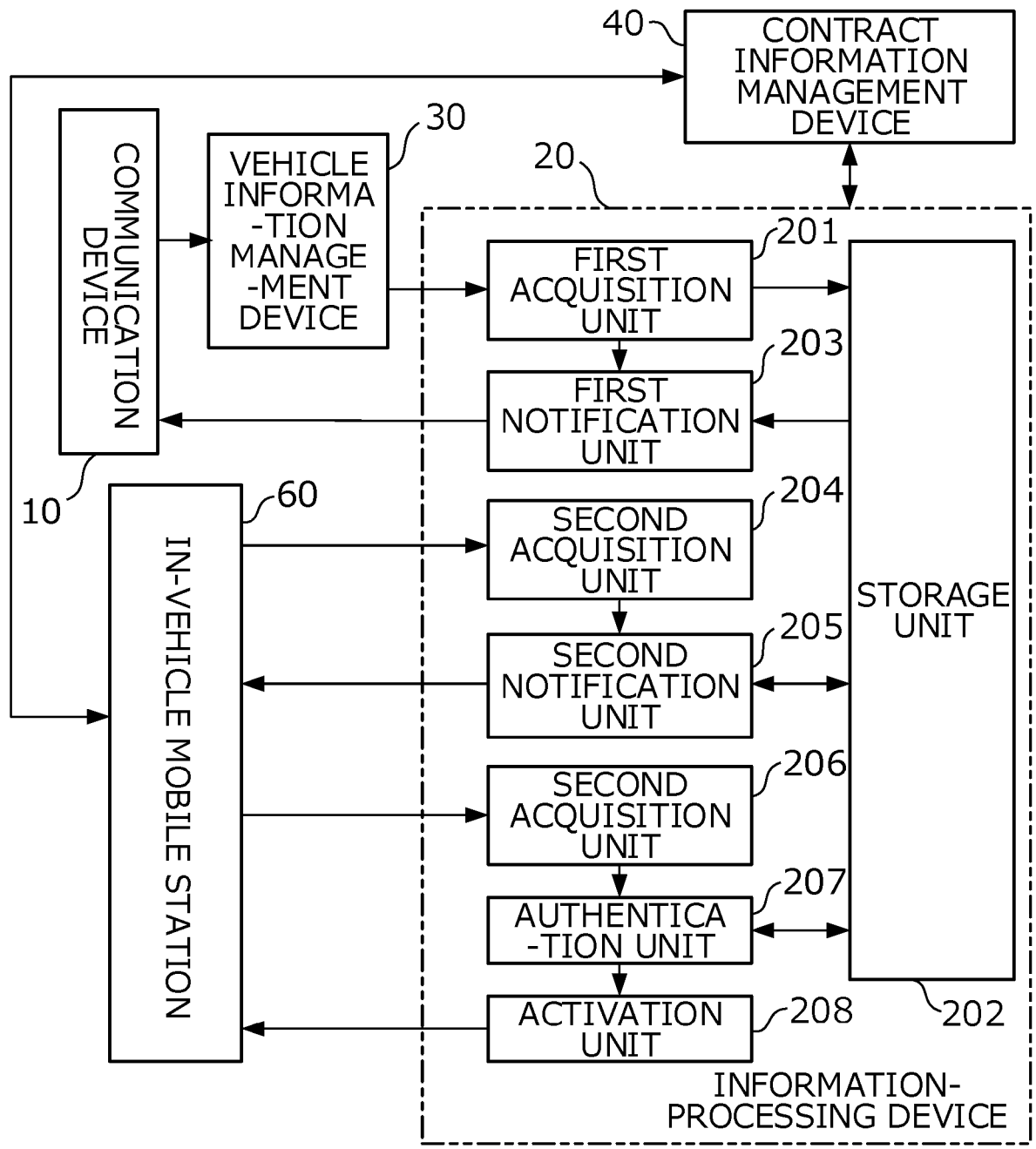
FIG. 15 is a block diagram showing a second example of a functional configuration of communication system according to an embodiment of the present invention.

FIG. 15 is a block diagram showing a functional configuration for carrying out (1-1) the first example of a profile registration operation or (1-2) the second example of a profile registration operation, and (2-2) the second example of a profile writing operation. In information-processing device 20 shown in the drawing, first acquisition unit 201 is configured to acquire, from vehicle information management device 30, SIM identification information of SIM 6007 of in-vehicle mobile station 60, and the telecommunications carrier identification information for identifying a telecommunications carrier that provides a communication service to the in-vehicle mobile station 60. Storage unit 202 is configured to store the SIM identification information and the telecommunications carrier identification information that are acquired by first acquisition unit 201, in association with authentication information for authenticating a user of the in-vehicle mobile station 60. First notification unit 203 is configured, upon detecting that a communication service contract is signed between the user and a telecommunications carrier identified by the telecommunications carrier identification information acquired by first acquisition unit 201, to notify communication device 10 of the authentication information. Second acquisition unit 204 is configured to acquire, from the in-vehicle mobile station 60, the SIM identification information of the in-vehicle mobile station 60. Second notification unit 205 is configured to notify the in-vehicle mobile station 60 of the telecommunications carrier identification information which is stored in storage unit 202 in association with the SIM identification information acquired by second acquisition unit 204. Third acquisition unit 206 is configured to acquire, from the in-vehicle mobile station 60, authentication information input in the in-vehicle mobile station 60, and the SIM identification information of the in-vehicle mobile station 60. Authentication unit 207 is configured to perform user authentication by checking the authentication information and the SIM identification information of the in-vehicle mobile station 60 that are acquired by third acquisition unit 206, against the authentication information and the SIM identification information of the in-vehicle mobile station 60 that are stored in storage unit 202. Activation unit 208 is configured, upon detecting that the user authentication succeeds, to activate the SIM 6007 of the in-vehicle mobile station 60 in which a profile is written by contract information management device 40.

Figure 16:
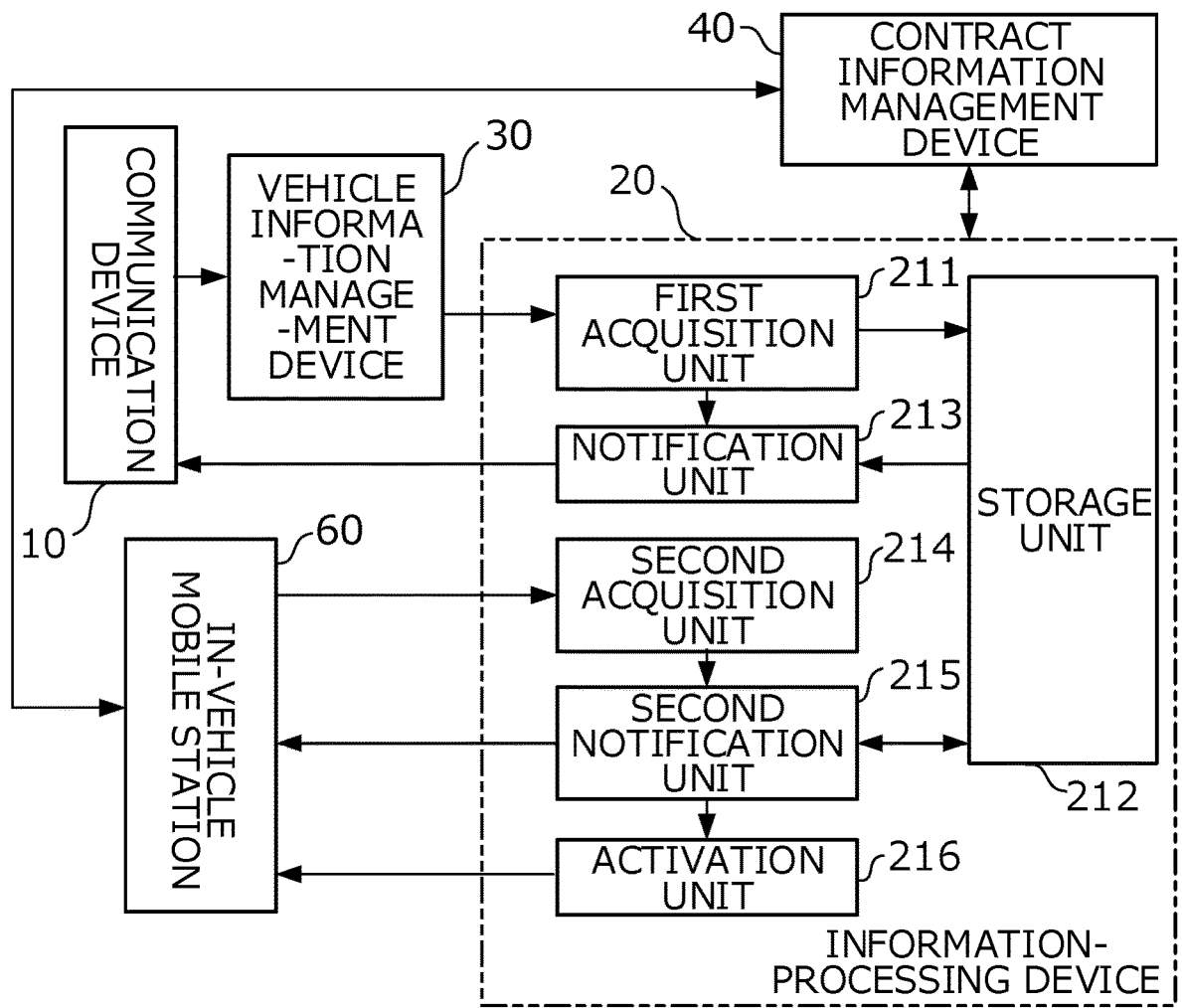
FIG. 16 is a block diagram showing a third example of a functional configuration of communication system according to an embodiment of the present invention.

FIG. 16 is a block diagram showing a functional configuration for carrying out (1-1) the first example of a profile registration operation or (1-2) the second example of a profile registration operation, and (2-3) the third example of a profile writing operation. In information-processing device 20 shown in the drawing, first acquisition unit 211 is configured to acquire, from vehicle information management device 30, SIM identification information of SIM 6007 of in-vehicle mobile station 60, and the telecommunications carrier identification information for identifying a telecommunications carrier that provides a communication service to the in-vehicle mobile station 60. Storage unit 212 is configured to store the SIM identification information and the telecommunications carrier identification information that are acquired by first acquisition unit 211, in association with authentication information for authenticating a user of the in-vehicle mobile station 60. First notification unit 213 is configured, upon detecting that a communication service contract is signed between the user and a telecommunications carrier identified by the telecommunications carrier identification information acquired by first acquisition unit 211, to notify communication device 10 of the authentication information. Second acquisition unit 214 is configured to acquire, from the in-vehicle mobile station 60, the SIM identification information of the in-vehicle mobile station 60. Second notification unit 215 is configured to notify the in-vehicle mobile station 60 of the telecommunications carrier identification information and the authentication information which are stored in storage unit 212 in association with the SIM identification information acquired by second acquisition unit 214. Activation unit 216 is configured, upon detecting that user authentication succeeds in the in-vehicle mobile station 60, to activate the SIM 6007 of the in-vehicle mobile station 60 in which a profile is written by contract information management device 40.

According to the embodiment described in the foregoing, an in-vehicle mobile station can be made usable in an easy manner.

MODIFICATION EXAMPLES

The present invention is not limited to the above embodiment. The above embodiment may be modified as described below. Two or more modifications described below may be combined.

Modification Example 1

In the above embodiment, an eID or an ICCID is used as the telecommunications carrier identification information; however, telecommunications carrier identification information is not limited to the examples. The telecommunications carrier identification information may refer to any information that can identify a telecommunications carrier. For example, an international mobile subscriber identity (IMSI) stored in a SIM may be used as the telecommunications carrier identification information.

Modification Example 2

A profile registration operation and a profile writing operation may be modified as described below.

Figure 17:
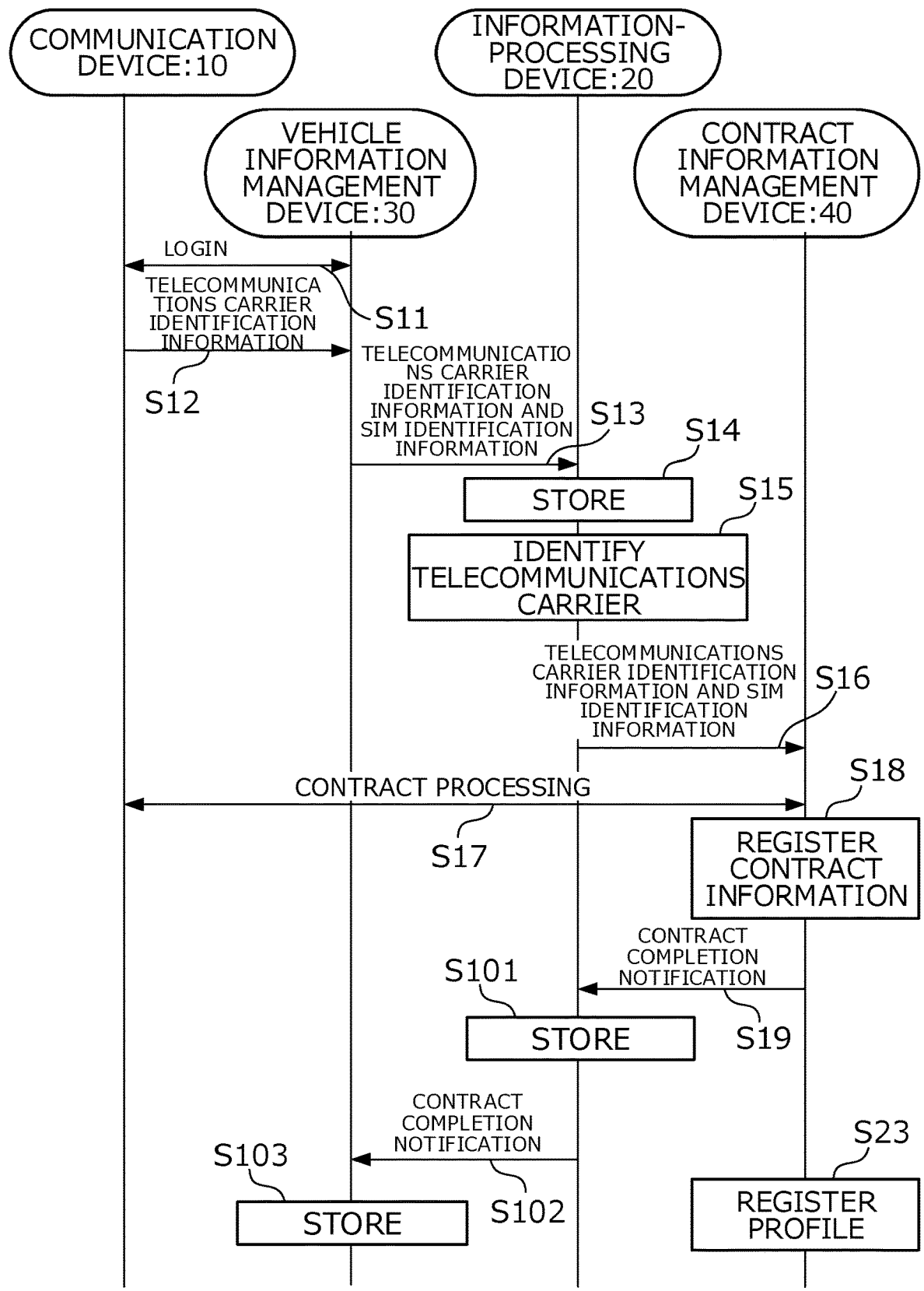
FIG. 17 is a sequence chart showing a modified version of a profile registration operation performed by communication system according to an embodiment of the present invention.

FIG. 17 is a sequence chart showing a modified version of a profile registration operation performed by communication system 1. In the sequence chart shown in the drawing, steps S11 to S19 and step S23 are the same as steps S11 to S19 and step S23 shown in FIG. 5. At step S19, contract information management device 40 sends a contract completion notification to information-processing device 20. In response to the contract completion notification, information-processing device 20, instead of generating authentication information, stores information "contract exists" in association with the telecommunications carrier identification information (for example, "ICCID001") and SIM identification information (for example, "eID001"), as shown in FIG. 18 (step S101). Subsequently, information-processing device 20 sends a contract completion notification including the SIM identification information (for example, "eID001") to vehicle information management device 30 (step 102). In response to the contract completion notification, vehicle information management device 30 stores contract existence information "exist" in association with a user ID (for example, "U001"), vehicle identification information (for example, "C001"), and the SIM identification information (for example, "eID001"), as shown in FIG. 19 (step S103).

Figure 20:
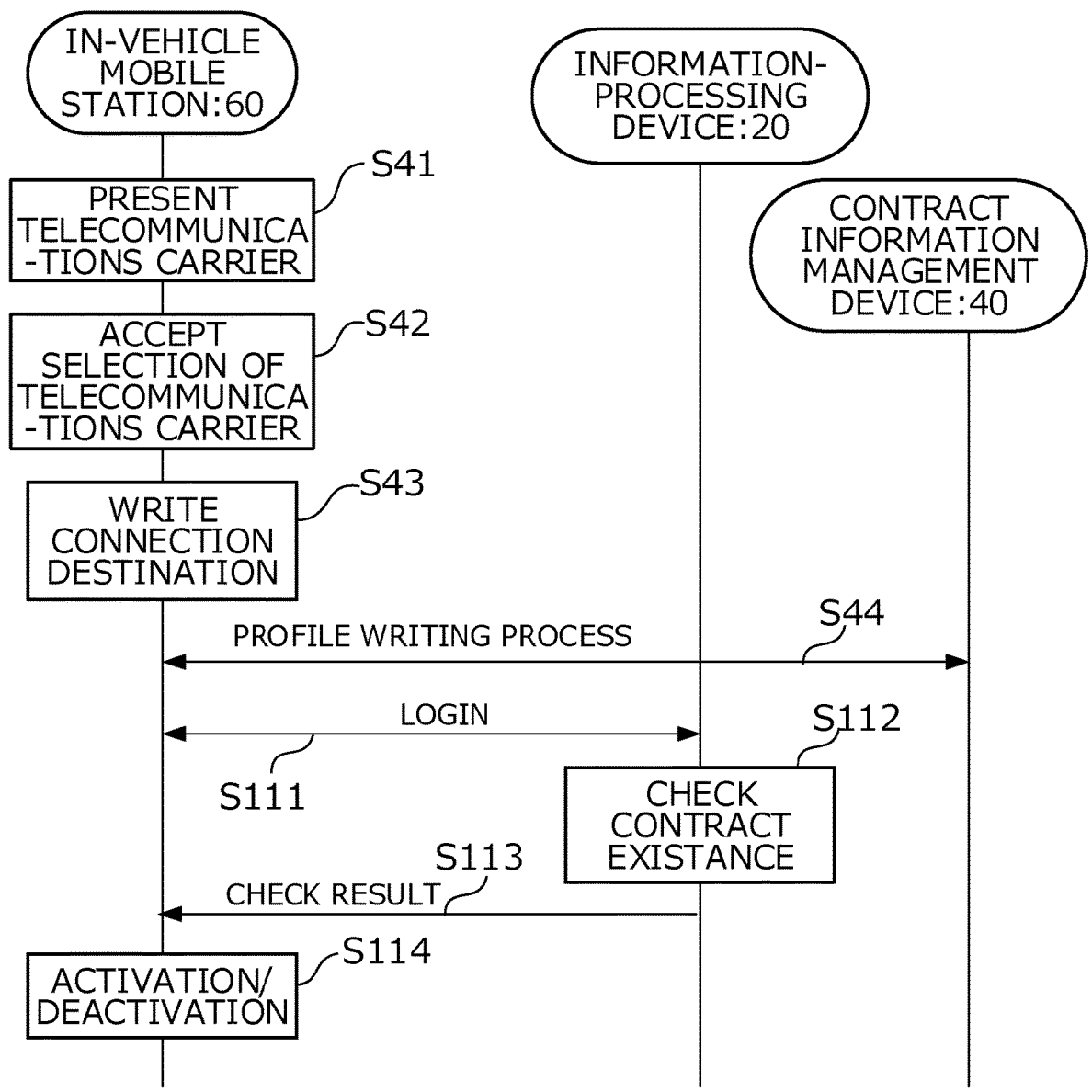
FIG. 20 is a sequence chart showing a profile writing operation performed by communication system in the modified version according to an embodiment of the present invention.

FIG. 20 is a sequence chart showing a modified version of a profile writing operation. In the sequence chart shown in the drawing, steps S41 to S44 are the same as steps S41 to S44 shown in FIG. 11. At step S44, contract information management device 40 writes a profile in the SIM 6007 of in-vehicle mobile station 60. After that, a user accesses vehicle information management device 30 to log in with a user ID and a password (step S111). When doing so, the user uses a communication function of an M2M eSIM of SIM 6007 of the in-vehicle mobile station 60. After the user logs in to vehicle information management device 30 with a user ID, the device determines whether the authenticated user has signed a communication service contract, based on the user ID and information shown in FIG. 19 (step S112). After the determination, vehicle information management device 30 sends a result of the determination to the in-vehicle mobile station 60 by use of the communication function of the M2M eSIM of the SIM 6007 (step S113). When the result of the determination sent to the in-vehicle mobile station 60 indicates that the user has signed a communication service contract, the mobile station activates the profile written in a storage area for a consumer SIM of the SIM 6007. On the other hand, when the result of the determination indicates that the user has not signed a communication service contract, the mobile station deactivates the profile (step S114). According to the foregoing procedure, the SIM 6007 can be activated by a valid user who can log in to vehicle information management device 30. In other words, a communication service can be provided to only a valid user by use of information for identifying and authenticating the user.

Other Modification Examples

The block diagram used to explain the above-described embodiment illustrates functional unit blocks. These functional blocks (components) are realized by arbitrarily combining hardware and/or software. The means for realizing each functional block is not particularly limited. That is, each functional block may be realized by one device that is physically and/or logically bound, or may be realized by two or more devices, which are physically and/or logically separated, being directly and/or indirectly (for example, via a wire and/or wirelessly) connected.

Each mode/embodiment explained in the present specification may be applied to LTE (long term evolution), LTE-A (LTE-advanced), SUPER 3G, IMT-advanced, 4G, 5G, FRA (future radio access), W-CDMA (registered trademark), GSM (registered trademark), CDMA2000, UMB (ultra mobile broadband), IEEE 802.11 (Wi-Fi), IEEE 802.16 (WiMAX), IEEE 802.20, UWB (ultra-wide band), Bluetooth (registered trademark), other systems that use suitable systems and/or next-generation systems expanded on the basis thereof.

The order of the process steps, sequences, flowcharts, and the like of each mode/embodiment explained in the present specification may be interchanged, provided no specific order exists. For example, the methods explained in the present specification present elements of various steps using the orders thereof as examples, and the orders are not limited to the specific orders presented.

Each mode/embodiment explained in the present specification may be used singularly or in combination, or switched according to the execution thereof. Moreover, notification of predetermined information (for example, notifying "of being X") is not limited to being performed explicitly, and may be performed implicitly (for example, not notifying about the predetermined information).

The terms "system" and "communication network" are used interchangeably in the present specification.

The information or parameter explained in the present specification may be represented as absolute values or represented as relative values from predetermined values, or may be represented as other corresponding information. For example, a wireless resource may be indicated by an index.

The above-described names used for the parameters are not limited in any respect. Moreover, mathematical formulae or the like that use the parameters sometimes differ from those explicitly disclosed in the present specification. Various channels (for example, PUCCH, PDCCH, etc.) and information elements (for example, TPC, etc.) can be identified using suitable names; therefore, the various names assigned to the various channels and information elements are not limited in any respect.

In the present disclosure, terms such as "base station (BS)," "wireless base station," "fixed station," "NodeB," "eNodeB (eNB)," "gNodeB (gNB)," "access point," "transmission point," "reception point," "transmission/reception point," "cell," "sector," "cell group," "carrier," and "component carrier" may be used interchangeably. A base station is sometimes referred to by the terms macro cell, small cell, femtocell, picocell, or the like. A base station is capable of accommodating one or a plurality (three, for example) of cells. If a base station accommodates a plurality of cells, the entire coverage area of the base station can be divided into a plurality of smaller areas, and each of the smaller areas is capable of providing a communication service using a base station subsystem (for example, a remote radio head (RRH)). The terms "cell" or "sector" indicates a portion or the entirety of the coverage area of the base station that performs a communication service in the aforementioned coverage area and/or the base station subsystem.

The term "determining" used in the present specification may include various operations. The term "determining" may include, for example, "determining" as in judging, calculating, computing, processing, deriving, investigating, looking up (for example, looking up in a table, database or another data structure), and ascertaining. Moreover, the term "determining" may include "determining" of receiving (for example, receiving information), transmitting (for example, transmitting information), input, output, and accessing (for example, accessing data in a memory). Furthermore, the term "determining" may include "determining" as in resolving, selecting, choosing, establishing, comparing, and the like. That is, the term "determining" may include the fact that some operation has been "determined."

The present invention may be presented as an information-processing method comprising a step of processing performed in communication device 10 or communication system 1. Moreover, the present invention may be presented as a program that is executed in communication device 10. The program can be presented by a mode of being recorded in a recording medium such as an optical disk, presented by a mode of being downloaded onto a computer via a communication network such as the Internet, and installing the program so as to be usable, or the like.

Software, instructions, and the like may be transmitted/ received via a transmission medium. If, for example, software is transmitted from a website, a server or another remote source using wired technology such as a coaxial cable, an optical fiber cable, a twisted pair wire, a digital subscriber line (DSL) or the like and/or wireless technology such as infrared rays, wireless and microwaves, the wired technology and/or wireless technology are included in the definition of a transmission medium.

The information, signals, and the like, explained in the present specification may be represented using any of various different techniques. For example, data, instructions, commands, information, signals, bits, symbols, chips, and the like, which may be mentioned across the entire explanation above, may be represented by voltage, current, magnetic waves, magnetic fields or magnetic particles, optical fields or protons, or an arbitrary combination thereof.

The terms explained in the present specification and/or terms required to understand the present specification may be replaced with terms having the same or similar meanings. For example, channel and/or symbol may be signal. Moreover, signal may be message. Furthermore, component carrier (CC) may be referred to as carrier frequency, cell, or the like.

The overall element amount or order of various references to elements referred to as "the first," "the second" and the like in the present specification are not limited thereto. The references may be used in the present specification as methods that are useful for differentiating between two or more elements. Accordingly, references to the first and second elements do not signify that only the two elements may be adopted in that instance, or that the first element must precede the second element in some form.

The term "means" in the configuration of each device described above may be replaced with the terms "unit," "circuit," "device," or the like.

As long as the terms "including," "comprising" and modifications thereof are used within the present specification or claims, the intention of the terms are comprehensive, similarly to the term "provided with." Moreover, the intention for the term "or" used in the present specification or claims is not to be exclusive or "or".

In the entirety of the present disclosure, if, for example, an article (a, an, the) is added, the article is considered to include plurals thereof if it is not clearly singular from the context.

Above is a detailed explanation of the present invention, but it would be obvious to a person skilled in the art that the present invention is not limited to the embodiment explained in the present specification. The present invention may be embodied as corrected and modified modes without deviating from the purpose and scope of the present invention defined by the disclosure in the claims. Accordingly, the disclosure in the present specification aims to explain examples, and does not have a limited significance with respect to the present invention.

EXPLANATION OF REFERENCE NUMERALS

1: Communication system
2: Communication network
10: Communication device
20: Information-processing device
21: First acquisition unit
22: Storage unit
23: Notification unit
24: Second acquisition unit
25: Authentication unit
26: Activation unit
201: First acquisition unit
202: Storage unit
203: First notification unit
204: Second acquisition unit
205: Second notification unit
206: Third acquisition unit
207: Authentication unit
208: Activation unit
211: First acquisition unit
212: Storage unit
213: Notification unit
214: Second acquisition unit
215: Second notification unit
216: Activation unit
30: Vehicle information management device
40: Contract information management device
1001: Processor
1002: Memory
1003: Storage
1004: Communication device
1005: Input device
1006: Output device
1007: SIM
2001: Processor
2002: Memory
2003: Storage
2004: Communication device
2005: Input device
2006: Output device
6001: Processor
6002: Memory
6003: Storage
6004: Communication device
6005: Input device
6006: Output device
6007: SIM

What is claimed is:

1. An information-processing device comprising:
a first acquisition unit configured to acquire subscriber identify module card (SIM) identification information of a SIM of an in-vehicle mobile station, and telecommunications carrier identification information for identifying a telecommunications carrier that provides a communication service to the in-vehicle mobile station;
a storage unit configured to store the SIM identification information and the telecommunications carrier identification information that are acquired by the first acquisition unit, in association with authentication information for authenticating a user of the in-vehicle mobile station;
a notification unit configured, upon detecting that a communication service contract is signed between the user and a telecommunications carrier identified by the telecommunications carrier identification information acquired by the first acquisition unit, to notify a communication device of the user of the authentication information;
a second acquisition unit configured to acquire, from the in-vehicle mobile station, authentication information input in the in-vehicle mobile station and the SIM identification information of the in-vehicle mobile station;
an authentication unit configured to perform user authentication by checking the authentication information and the SIM identification information of the in-vehicle mobile station that are acquired by the second acquisition unit, against the authentication information and the SIM identification information of the in-vehicle mobile station that are stored in the storage unit; and
an activation unit configured, upon detecting that the user authentication succeeds, to activate the SIM of the in-vehicle mobile station, in which a profile is written.

2. The information-processing device according to claim 1, wherein:
the communication device of the user is a mobile station different from the in-vehicle mobile station; and
the telecommunications carrier identification information is an IC card identifier (ICCID) or an embedded identifier (eID) stored in a SIM of the mobile station.

3. The information-processing device according to claim 1, wherein the telecommunications carrier identification information is a mobile network operator identifier (MNOID) for identifying a telecommunications carrier selected by the user.

4. An information-processing device comprising:
a first acquisition unit configured to acquire SIM identification information of a SIM of an in-vehicle mobile station, and telecommunications carrier identification information for identifying a telecommunications carrier that provides a communication service to the in-vehicle mobile station;
a storage unit configured to store the SIM identification information and the telecommunications carrier identification information that are acquired by the first acquisition unit, in association with authentication information for authenticating a user of the in-vehicle mobile station;

a first notification unit configured, upon detecting that a communication service contract is signed between the user and a telecommunications carrier identified by the telecommunications carrier identification information acquired by the first acquisition unit, to notify a communication device of the user of the authentication information;

a second acquisition unit configured to acquire, from the in-vehicle mobile station, the SIM identification information of the in-vehicle mobile station;

a second notification unit configured to notify the in-vehicle mobile station of the telecommunications carrier identification information which is stored in the storage unit in association with the SIM identification information acquired by the second acquisition unit;

a third acquisition unit configured to acquire, from the in-vehicle mobile station, authentication information input in the in-vehicle mobile station, and the SIM identification information of the in-vehicle mobile station;

an authentication unit configured to perform user authentication by checking the authentication information and the SIM identification information of the in-vehicle mobile station that are acquired by the third acquisition unit, against the authentication information and the SIM identification information of the in-vehicle mobile station that are stored in the storage unit; and an activation unit configured, upon detecting that the user authentication succeeds, to activate the SIM of the in-vehicle mobile station, in which a profile is written.

5. The information-processing device according to claim 4, wherein:

the communication device of the user is a mobile station different from the in-vehicle mobile station; and the telecommunications carrier identification information is an IC card identifier (ICCID) or an embedded identifier (eID) stored in a SIM of the mobile station.

6. The information-processing device according to claim 4, wherein the telecommunications carrier identification information is a mobile network operator identifier (MNOID) for identifying a telecommunications carrier selected by the user.

7. An information-processing device comprising:

a first acquisition unit configured to acquire SIM identification information of a SIM of an in-vehicle mobile station, and telecommunications carrier identification information for identifying a telecommunications carrier that provides a communication service to the in-vehicle mobile station;

a storage unit configured to store the SIM identification information and the telecommunications carrier identification information that are acquired by the first acquisition unit, in association with authentication information for authenticating a user of the in-vehicle mobile station;

a first notification unit configured, upon detecting that a communication service contract is signed between the user and a telecommunications carrier identified by the telecommunications carrier identification information acquired by the first acquisition unit, to notify a communication device of the user of the authentication information;

a second acquisition unit configured to acquire, from the in-vehicle mobile station, the SIM identification information of the in-vehicle mobile station:

a second notification unit configured to notify the in-vehicle mobile station of the telecommunications carrier identification information and the authentication information which are stored in the storage unit in association with the SIM identification information acquired by the second acquisition unit; and an activation unit configured, upon detecting that authentication using the authentication information succeeds in the in-vehicle mobile station, to activate the SIM of the in-vehicle mobile station, in which a profile is written.

8. The information-processing device according to claim 7, wherein:

the communication device of the user is a mobile station different from the in-vehicle mobile station; and the telecommunications carrier identification information is an IC card identifier (ICCID) or an embedded identifier (eID) stored in a SIM of the mobile station.

9. The information-processing device according to claim 7, wherein the telecommunications carrier identification information is a mobile network operator identifier (MNOID) for identifying a telecommunications carrier selected by the user.

10. A communication system comprising:

an in-vehicle mobile station;

a communication device of a user;

a contract information management device configured to write a profile in a SIM of the in-vehicle mobile station;

a vehicle information management device configured to store SIM identification information of the SIM of the in-vehicle mobile station; and an information-processing device, wherein the information-processing device includes:

a first acquisition unit configured to acquire, from the vehicle information management device, the SIM identification information of the SIM of the in-vehicle mobile station, and telecommunications carrier identification information for identifying a telecommunications carrier that provides a communication service to the in-vehicle mobile station;

a storage unit configured to store the SIM identification information and the telecommunications carrier identification information that are acquired by the first acquisition unit, in association with authentication information for authenticating the user of the in-vehicle mobile station;

a notification unit configured, upon detecting that a communication service contract is signed between the user and a telecommunications carrier identified by the telecommunications carrier identification information acquired by the first acquisition unit, to notify the communication device of the authentication information;

a second acquisition unit configured to acquire, from the in-vehicle mobile station, authentication information input in the in-vehicle mobile station and the SIM identification information of the in-vehicle mobile station;

an authentication unit configured to perform user authentication by checking the authentication information and the SIM identification information of the in-vehicle mobile station that are acquired by the second acquisition unit, against the authentication information and the SIM identification information of the in-vehicle mobile station that are stored in the storage unit; and an activation unit configured, upon detecting that the user authentication succeeds, to activate the SIM of the in-vehicle mobile station, in which a profile is written by the contract information management device.

11. A communication system comprising:

an in-vehicle mobile station;

a communication device of a user;

a contract information management device configured to write a profile in a SIM of the in-vehicle mobile station;

a vehicle information management device configured to store SIM identification information of the SIM of the in-vehicle mobile station; and an information-processing device, wherein the information-processing device includes:

a first acquisition unit configured to acquire, from the vehicle information management device, the SIM identification information of the SIM of the in-vehicle mobile station, and telecommunications carrier identification information for identifying a telecommunications carrier that provides a communication service to the in-vehicle mobile station;

a storage unit configured to store the SIM identification information and the telecommunications carrier identification information that are acquired by the first acquisition unit, in association with authentication information for authenticating the user of the in-vehicle mobile station;

a first notification unit configured, upon detecting that a communication service contract is signed between the user and a telecommunications carrier identified by the telecommunications carrier identification information acquired by the first acquisition unit, to notify the communication device of the authentication information;

a second acquisition unit configured to acquire, from the in-vehicle mobile station, the SIM identification information of the in-vehicle mobile station;

a second notification unit configured to notify the in-vehicle mobile station of the telecommunications carrier identification information which is stored in the storage unit in association with the SIM identification information acquired by the second acquisition unit;

a third acquisition unit configured to acquire, from the in-vehicle mobile station, authentication information input in the in-vehicle mobile station, and the SIM identification information of the in-vehicle mobile station;

an authentication unit configured to perform user authentication by checking the authentication information and the SIM identification information of the in-vehicle mobile station that are acquired by the third acquisition unit, against the authentication information and the SIM identification information of the in-vehicle mobile station that are stored in the storage unit; and an activation unit configured, upon detecting that the user authentication succeeds, to activate the SIM of the in-vehicle mobile station, in which a profile is written by the contract information management device.

12. A communication system comprising:

an in-vehicle mobile station;

a communication device of a user;

a contract information management device configured to write a profile in a SIM of the in-vehicle mobile station;

a vehicle information management device configured to store SIM identification information of the SIM of the in-vehicle mobile station; and an information-processing device, wherein the information-processing device includes:

a first acquisition unit configured to acquire, from the vehicle information management device, the SIM identification information of the SIM of the in-vehicle mobile station, and telecommunications carrier identification information for identifying a telecommunications carrier that provides a communication service to the in-vehicle mobile station;

a storage unit configured to store the SIM identification information and the telecommunications carrier identification information that are acquired by the first acquisition unit, in association with authentication information for authenticating the user of the in-vehicle mobile station;

a first notification unit configured, upon detecting that a communication service contract is signed between the user and a telecommunications carrier identified by the telecommunications carrier identification information acquired by the first acquisition unit, to notify the communication device of the authentication information;

a second acquisition unit configured to acquire, from the in-vehicle mobile station, the SIM identification information of the in-vehicle mobile station:

a second notification unit configured to notify the in-vehicle mobile station of the telecommunications carrier identification information and the authentication information which are stored in the storage unit in association with the SIM identification information acquired by the second acquisition unit; and an activation unit configured, upon detecting that authentication using the authentication information succeeds in the in-vehicle mobile station, to activate the SIM of the in-vehicle mobile station, in which a profile is written by the contract information management device.

* * * * *